United States Patent [19]
Bergantino et al.

[11] Patent Number: 6,128,303
[45] Date of Patent: Oct. 3, 2000

[54] ASYNCHRONOUS TRANSFER MODE CELL PROCESSING SYSTEM WITH SCOREBOARD SCHEDULING

[75] Inventors: Paul V. Bergantino, Arlington; Daniel J. Lussier, Bellingham, both of Mass.

[73] Assignee: Maker Communications, Inc., Framingham, Mass.

[21] Appl. No.: 08/647,374

[22] Filed: May 9, 1996

[51] Int. Cl.$^7$ .................................................. H04L 12/56
[52] U.S. Cl. ............................................ 370/398; 370/458
[58] Field of Search .................................... 370/395, 396, 370/397, 398, 399, 409, 410, 412, 415, 428, 429, 442, 443, 444, 458, 459

[56] References Cited

U.S. PATENT DOCUMENTS

| | | |
|---|---|---|
| 4,589,087 | 5/1986 | Auslander et al. . |
| 4,926,374 | 5/1990 | Schaffer . |
| 4,947,388 | 8/1990 | Kuwahara et al. . |
| 5,008,807 | 4/1991 | Krueger et al. . |
| 5,130,975 | 7/1992 | Akata . |
| 5,136,584 | 8/1992 | Hedlund . |
| 5,241,536 | 8/1993 | Grimble et al. ......................... 370/398 |
| 5,247,627 | 9/1993 | Murakami et al. . |
| 5,249,178 | 9/1993 | Kurano et al. . |
| 5,253,247 | 10/1993 | Hirose et al. .............................. 370/14 |
| 5,265,091 | 11/1993 | van Landegem .......................... 370/60 |
| 5,271,005 | 12/1993 | Takase et al. .............................. 370/79 |
| 5,274,641 | 12/1993 | Shobatake et al. ..................... 370/94.1 |
| 5,280,475 | 1/1994 | Yanagi et al. ............................ 370/399 |
| 5,365,519 | 11/1994 | Kozaki et al. ............................. 370/60 |
| 5,379,295 | 1/1995 | Yonehara ................................. 370/400 |
| 5,381,407 | 1/1995 | Chao ........................................ 370/60 |
| 5,390,184 | 2/1995 | Morris . |
| 5,394,397 | 2/1995 | Yanagi et al. ............................ 370/390 |

(List continued on next page.)

FOREIGN PATENT DOCUMENTS

| | | |
|---|---|---|
| 0 690 596 A1 | 1/1996 | European Pat. Off. . |
| 0 702 473 A1 | 3/1996 | European Pat. Off. . |
| 0 705 007 A2 | 4/1996 | European Pat. Off. . |

OTHER PUBLICATIONS

William Stallings, *Local and Metropolitan Area Networks*, Macmillan Publishing Corp. (N.Y., N.Y. 1993) pp. 260–261.

Unpublished document, "CellMaker/SwitchMaker," Rev 0.2, Maker Communications Equipment Corp., Released under Non–disclosure Agreement, Feb. 22, 1995.

*Primary Examiner*—Chi H. Pham
*Assistant Examiner*—Kwang B. Yao
*Attorney, Agent, or Firm*—Proskauer Rose LLP

[57] ABSTRACT

Methods and apparatus for processing cells in an asynchronous transfer mode (ATM) communication system. A group of bits comprises a primary scoreboard indicative of the scheduling status for cell time slots in a periodic container of cells, with each bit indicating the availability of a corresponding cell time slot. A connection identifier (ID) table is maintained with each location in the table corresponding to one of the cell time slots and thus a single primary scoreboard bit. A cell scheduling instruction specifies a connection ID for a virtual connection on an ATM transmission link. A processor searches the primary scoreboard until a bit corresponding to an available cell time slot is located, reserves the located cell slot by setting the corresponding bit, and stores the connection ID in the corresponding location in the connection ID table. A cell servicing instruction specifies an address in the connection ID table. The processor receives the servicing instruction, retrieves the corresponding primary scoreboard bit, constructs or retrieves a cell for transmission in the slot if the bit was set, and then clears the bit so the slot is available for subsequent scheduling requests. A secondary scoreboard may be used to bound the primary scoreboard search time. The secondary scoreboard includes a bit for each block of primary scoreboard bits. The bit indicates whether the primary scoreboard block includes an available time slot. Portions of the primary scoreboard with no available slots thus need not be searched. Separate tunnel control primary scoreboards may be used in conjunction with a master primary scoreboard to support virtual path tunneling.

44 Claims, 9 Drawing Sheets

U.S. PATENT DOCUMENTS

| | | |
|---|---|---|
| 5,412,655 | 5/1995 | Yamada et al. . |
| 5,420,859 | 5/1995 | Takase et al. ............................ 370/60.1 |
| 5,440,552 | 8/1995 | Sugita et al. . |
| 5,446,726 | 8/1995 | Rostoker et al. .......................... 370/17 |
| 5,448,567 | 9/1995 | Dighe et al. ............................ 370/94.2 |
| 5,450,400 | 9/1995 | Denissen et al. .......................... 370/61 |
| 5,455,826 | 10/1995 | Ozveren et al. ............................ 370/60 |
| 5,463,622 | 10/1995 | Keller et al. . |
| 5,467,347 | 11/1995 | Petersen . |
| 5,500,851 | 3/1996 | Kozaki et al. . |
| 5,521,915 | 5/1996 | Dieudonne et al. . |
| 5,526,352 | 6/1996 | Min et al. . |
| 5,528,592 | 6/1996 | Schibler et al. . |
| 5,530,806 | 6/1996 | Condon et al. . |
| 5,533,020 | 7/1996 | Byrn et al. . |
| 5,535,201 | 7/1996 | Zheng ...................................... 370/231 |
| 5,541,918 | 7/1996 | Ganmukhi et al. . |
| 5,544,172 | 8/1996 | Abbas . |
| 5,548,588 | 8/1996 | Ganmukhi et al. . |
| 5,563,884 | 10/1996 | Fimoff et al. . |
| 5,577,035 | 11/1996 | Hayter et al. ............................ 370/395 |
| 5,598,410 | 1/1997 | Stone . |
| 5,598,541 | 1/1997 | Malladi . |
| 5,602,853 | 2/1997 | Ben-Michael et al. . |
| 5,610,914 | 3/1997 | Yamada ...................................... 370/395 |
| 5,633,867 | 5/1997 | Ben-Nun et al. . |

FIG. 9

| | | | | | | | | | | | | | | | |
|---|---|---|---|---|---|---|---|---|---|---|---|---|---|---|---|
| VP1 1 | VP2 1 | 0 | 0 | VP1 1 | 0 | 0 | 0 | 0 | VP1 1 | 0 | 0 | 0 | VP1 1 | 0 | RSV 1 |
| VP3 1 | VP2 1 | VP1 1 | 0 | 0 | 0 | VP1 0 | 0 | 0 | 0 | 0 | VP1 1 | 0 | 0 | 0 | 0 |
| VP1 1 | VP2 1 | 0 | 0 | VP1 1 | 0 | 0 | 0 | 0 | VP1 1 | 0 | 0 | 0 | VP1 1 | 0 | RSV 1 |
| VP3 1 | VP2 1 | VP1 1 | 0 | 0 | 0 | VP1 0 | 0 | 0 | 0 | 0 | VP1 1 | 0 | 0 | 0 | 0 |
| ABR 0 | 1 | 1 | 1 | ABR 0 | 1 | 1 | 1 | 1 | ABR 0 | 1 | 1 | 1 | ABR 0 | 1 | 1 |
| 1 | 1 | ABR 0 | 1 | 1 | 1 | 1 | ABR 0 | 1 | 1 | 1 | 1 | ABR 0 | 1 | 1 | 1 |
| ABR 0 | 1 | 1 | 1 | ABR 0 | 1 | 1 | 1 | 1 | ABR 0 | 1 | 1 | 1 | ABR 0 | 1 | 1 |
| 1 | 1 | ABR 0 | 1 | 1 | 1 | 1 | ABR 0 | 1 | 1 | 1 | 1 | ABR 0 | 1 | 1 | 1 |
| 1 | ABR 0 | 1 | 1 | 1 | 1 | 1 | 1 | 1 | 1 | 1 | 1 | 1 | 1 | 1 | 1 |
| 1 | ABR 0 | 1 | 1 | 1 | 1 | 1 | 1 | 1 | 1 | 1 | 1 | 1 | 1 | 1 | 1 |
| 1 | ABR 0 | 1 | 1 | 1 | 1 | 1 | 1 | 1 | 1 | 1 | 1 | 1 | 1 | 1 | 1 |
| 1 | ABR 0 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 |
| ABR 0 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 |
| ABR 0 | 1 | 1 | 1 | 1 | 1 | 1 | 1 | 1 | 1 | 1 | 1 | 1 | 1 | 1 | 1 |

MASTER SCOREBOARD — 300
VP1 ABR TUNNEL CONTROL BOARD — 310
VP2 ABR TUNNEL CONTROL BOARD — 320
VP3 ABR TUNNEL CONTROL BOARD — 330

ASYNCHRONOUS TRANSFER MODE CELL PROCESSING SYSTEM WITH SCOREBOARD SCHEDULING

FIELD OF THE INVENTION

The present invention relates generally to asynchronous transfer mode (ATM) communication systems and more particularly to ATM cell processing operations in an ATM communication system.

RELATED APPLICATIONS

The present application is related to the following U.S. patent applications, each filed concurrently herewith and assigned to the present assignee: "Asynchronous Transfer Mode Cell Processing System With Multiple Cell Source Multiplexing," Ser. No. 08/647,373; "Asynchronous Transfer Mode Cell Processing System With Load Multiple Instruction and Memory Write-Back," Ser. No. 08/647,372; "Asynchronous Transfer Mode Cell Processing System With Cell Buffer Space Gathering," Ser. No. 08/647,371; and "Asynchronous Transfer Mode Cell Processing System With Modulo-Based Instruction Branching," Ser. No. 08/647,375.

BACKGROUND OF THE INVENTION

Asynchronous transfer mode (ATM) communication systems are designed to support high-speed, low-delay multiplexing and switching of voice, data, video and other types of user information traffic. An ATM system segments user traffic into fixed-length 53-byte cells. A 5-byte header in each cell typically includes a virtual channel identifier (VCI) and a virtual path identifier (VPI) associated with the corresponding cell. The VCI and VPI fields together identify a virtual connection (VC) which is established when a user requests a network connection in an ATM system. Additional details regarding these and other aspects of ATM systems can be found in the ATM Forum, "ATM User-Network Interface Specification," Version 3.1, September, 1994, and in Martin de Prycker, "Asynchronous Transfer Mode: Solution for Broadband ISDN," Ellis Horwood, New York, 1993, both of which are incorporated by reference herein. The allocation of available transmission opportunities or slots to user traffic cells is generally referred to as cell scheduling.

One possible ATM cell scheduling technique could involve calculating for a given VC an ideal time at which the VC should be serviced by allocating a cell to that VC. An ATM scheduling system could then mark in a stored table, list or other type of schedule the fact that a given VC X is ready for scheduling at a time Y. Because one or more other active VCs may have previously requested servicing at time Y, such a cell scheduling system would typically require a two-dimensional list of scheduling requests in which one dimension is time and the other dimension is the list of VCs scheduled to be serviced at a given time.

A significant problem with such a two-dimensional cell schedule is that it makes it difficult for a scheduling system to determine when a particular VC should be scheduled for servicing due to the fact that the calculation can no longer be based on time alone. This is because there could be a back-up of arbitrary depth at any given scheduled time. As a result, a servicing processor may arrive late at successive scheduled times. VCs that are scheduled further out in time could have been scheduled earlier in time had the scheduling system been aware of the delays that would be encountered by the servicing processor. For example, the scheduling system could have scheduled a given VC earlier in time while maintaining the necessary elapsed time between successive cell transmission events if it were able to account for the delays. This two-dimensional scheduling technique results in inefficient scheduling and thus reduced system throughput.

Prior art ATM cell processors also suffer from a number of other drawbacks. For example, most available cell processors typically utilize either a hard-wired approach to provide increased throughput speed or a programmable approach which provides a high degree of flexibility but at the cost of reducing throughput speed. Another problem is that prior art cell processor approaches generally do not allow system designers to provide a common, reprogrammable architecture suitable for use in a wide variety of different ATM-based products. Other serious problems with prior art cell processing include the latency associated with accessing control information from static random access memory (SRAM) or other types of control or system memory, the scheduling of constant bit rate (CBR) traffic in the presence of variable bit rate (VBR) traffic, and the failure of the prior art devices to provide support for virtual path (VP) tunneling.

As is apparent from the above, there is a need for improved ATM cell scheduling, servicing and other processing techniques which avoid the above-noted problems of the prior art.

SUMMARY OF THE INVENTION

The present invention provides apparatus and methods for processing asynchronous transfer mode (ATM) cells in an ATM communication system. The invention provides improved cell scheduling and servicing techniques as well as an improved ATM cell processor architecture. An ATM cell processor in accordance with the invention is particularly well-suited for use in high-speed ATM cell processing applications, and can provide cell throughput at speeds typically associated only with fully hard-wired devices, while simultaneously providing the increased flexibility of a programmable device. An ATM communication system based on a cell processor in accordance with the present invention can be readily configured to provide different operating parameters and is therefore relatively insensitive to changes in ATM standards. Many such changes can be implemented in a cell processor of the present invention through relatively simple software and/or firmware modifications.

One aspect of the invention involves a method of allocating cells in an ATM communication system. The method includes the step of generating a first group of bits in the form of a primary scoreboard. Each bit of the primary scoreboard represents a cell time slot on a transmission link in the communication system, and the value of a given primary scoreboard bit indicates whether or not the corresponding cell time slot is available for transmission. In response to a cell scheduling request of a given virtual connection in the ATM system, a processor directs the searching of the primary scoreboard beginning at a bit corresponding to a target time slot and proceeding through the scoreboard until a bit corresponding to an available time slot is identified. The available time slot is then scheduled by setting the identified primary scoreboard bit, and storing a connection identifier (ID) for the virtual connection in a connection ID table at a location corresponding to the identified primary scoreboard bit. The primary scoreboard and connection ID table can both be maintained in an external control memory which the ATM cell processor accesses through a high-speed memory port. Alternatively, the primary scoreboard and/or connection ID table can be maintained in a set of memory locations internal to the ATM cell processor to further reduce scheduling time, thereby allowing for higher rates on the transmission link and efficient implementation of more complex scheduling algorithms.

The scheduled time slots are serviced in response to a servicing instruction specifying an address in the connection ID table. The connection ID at that location is retrieved, as is the primary scoreboard bit corresponding to that location. The primary scoreboard bit is copied to an assigned cell flag register (ACFR) in the processor, and the scoreboard bit is then cleared to free the time slot for subsequent scheduling requests. The processor then directs the construction or retrieval of a cell for the virtual connection identified by the connection ID retrieved in response to the servicing instruction, and queues the cell for transmission over the ATM link in the scheduled time slot.

Another aspect of the invention involves a method for bounding the primary scoreboard search time to an acceptable range. A secondary scoreboard is generated in the form of a group of stored bits, with each secondary scoreboard bit indicating whether a corresponding block of primary scoreboard bits includes a bit indicative of an available cell time slot. When searching the primary scoreboard in response to a scheduling instruction, an ATM cell processor first directs the retrieval and searching of a block of primary scoreboard bits which includes a target slot specified in the scheduling instruction. If there is no available slot in the retrieved block, the ATM cell processor uses the secondary scoreboard to determine the location of a primary scoreboard block which does include an available slot. The ATM cell processor may access the secondary scoreboard in parallel with its access to the current block of primary scoreboard bits, such that if the current block does not include an available bit, the ATM cell processor already has the secondary scoreboard information identifying a primary scoreboard block which does include an available bit. This parallel access feature accelerates the search process. When an available slot is indicated in a retrieved primary scoreboard block, the remainder of the block is searched to determine if there are any other available slots remaining in that block. If there are no available slots remaining, the secondary scoreboard bit corresponding to the primary scoreboard block is set to indicate that all slots in the block are unavailable. In this manner, the processor does not waste time searching through portions of the primary scoreboard which do not include bits indicating available time slots. The search time can be bounded to a desired number of memory read cycles by appropriate selection of the number of primary scoreboard bits represented by each secondary scoreboard bit. The secondary scoreboard may be maintained in a set of memory locations internal to the ATM cell processor, without unduly increasing the cell processor die size.

Another aspect of the invention involves a technique for handling tunneling operations. One or more virtual path connections each reserve one or more cell time slots in a primary scoreboard for tunneling of virtual channel connections. This primary scoreboard is referred to as a master scoreboard. The master scoreboard bits corresponding to the slots reserved for virtual path connections are set using a suitable scheduling instruction. A separate primary scoreboard, referred to as a tunnel control scoreboard, is generated for each of the virtual path connections which reserve locations on the master scoreboard. The bits of each tunnel control board are configured such that bits corresponding to cell time slots not reserved on the master scoreboard are set to indicate unavailability, while bits corresponding to cell time slots reserved on the primary scoreboard for the given virtual path connection are cleared to indicate availability. The tunnel control boards are used for scheduling virtual channel connections which will use the corresponding virtual path tunnel, such that the connections are directed to the appropriate reserved bit locations.

The scheduled cell time slots are serviced by issuing a servicing instruction. The ATM cell processor may check a block or other portion of the master scoreboard resident in local control memory for an indication of whether a time slot about to be serviced for a given virtual connection is a time slot reserved for a virtual path connection utilizing the tunneling feature. If the ATM cell processor determines that the time slot was reserved for a virtual path connection, the processor determines which virtual channel connection to service by checking the corresponding time slot of the corresponding tunnel control scoreboard. After servicing the connection, the processor reschedules the present cell time in the master scoreboard to re-reserve it for the virtual path connection such that the pre-reserved bandwidth remains available on the transmission link. If the virtual channel connection requires further servicing, the processor reschedules it on the corresponding tunnel control scoreboard. The use of both a master primary scoreboard and separate tunnel control scoreboards for virtual path connections allows a user to, for example, reserve a constant bit rate (CBR) cell stream, represented by a number of master scoreboard bits, on the transmission link for a given virtual path connection, while at the same time using the tunnel control scoreboard to schedule available bit rate (ABR) connections for individual virtual channels on the given virtual path connection.

Another aspect of the invention involves a load multiple instruction which provides a burst transfer of a data block from Fast Access to Software Tables (FAST) control memory, and allows the result of a subsequent operation on a loaded value to be automatically written back to the control memory location from which it was previously read. The instruction may be implemented as a Load Multiple from FAST Memory (LMFM) instruction which specifies the address in the FAST control memory of a data block to be retrieved, a destination register in a CPU register file into which the first retrieved halfword of the data block will be loaded, and a total number of halfwords to be retrieved. The LMFM instruction may also include a link field option which directs the storage of information linking the processor registers which receive the retrieved halfwords to the control memory locations from which the halfwords were read. An automatic memory update feature may then be provided in, for example, an arithmetic logic unit (ALU) instruction which operates on one or more of the processor registers receiving the halfwords retrieved by the LMFM instruction. This feature may be provided by including in the ALU instruction an update memory (UM) field which indicates that the result of the corresponding ALU operation is to be written back to the control memory location or locations which supplied one or more of the operands.

Another aspect of the invention is a modulo arithmetic feature which permits branching on the modulo portion of the result of an arithmetic operation. In an exemplary embodiment, an ALU instruction is modified to include a modulo field which specifies the number of right to left bits after which the result of the corresponding ALU operation will be truncated. Conditional branch instructions such as branch on zero result, branch on non-zero result, branch on negative result, branch on carry and branch on overflow may be configured to operate only on the modulo portion of the ALU instruction result. In other embodiments, a conditional branch could be based in whole or in part on, for example, a carry out of the most significant bit (MSB) position of the modulo portion.

Another aspect of the invention is a cell buffer RAM (CBR) memory space gathering protocol which allows unused portions of a number of cell buffers to be addressed as a contiguous virtual memory space. The space gathering protocol may utilize a CPU or direct memory access (DMA) controller in an ATM cell processor to set a gather bit appended to a virtual CBR address. An address generator in the CBR detects the gather bit and translates those virtual addresses which include a set gather bit to physical addresses into the CBR memory space. The translation is performed by, for example, setting certain bits of the physical address to predetermined states to reach the unused 8 bytes at the bottom of any given 64-byte cell buffer, and shifting certain bits of the virtual address to other positions in the physical address to move from cell buffer to cell buffer in the contiguous virtual space. Multiple gather spaces may be supported in alternative embodiments by using a different number of gather bits. The position of the gather bit or bits in a given set of virtual addresses may vary depending on the CBR memory size.

Another aspect of the invention involves "bubble" count techniques which efficiently accommodate multiple layers of scheduling requests and/or external cell sources. In the case of multiple layers of scheduling requests, first and second primary scoreboards are provided for scheduling/servicing of, for example, higher and lower priority traffic, higher and lower cell rate traffic, or externally and internally generated traffic, respectively. A bubble count is maintained for the second scoreboard, and the count is incremented each time the first scoreboard is serviced and decremented each time an idle slot is encountered on the second scoreboard but not queued for transmission. Scheduling requests for the second scoreboard are then made at a target time plus the bubble count. In the case of multiplexing external and internal cell sources, the bubble count may represent the number of cells that have been sent on a given transmission link but not scheduled in the primary scoreboard, and may be incremented each time the primary scoreboard is serviced, and decremented each time an idle slot on the primary scoreboard is encountered but not queued for transmission. Cell servicing in bubble count applications may be facilitated by the use of a pop range (POPR) servicing instruction which specifies a target address on the primary scoreboard and determines if a set bit is found in a range from the target address to the sum of the target address and the bubble count.

Other aspects of the invention include the ability to provide full rate independence among different virtual connections, an inherently fair bandwidth allocation which requires only a single scheduled request to exist on the primary scoreboard at any given time for a given virtual connection to be considered active, the ability to support multiple layers of scheduling requests using multiple scoreboards based on traffic priority or cell rate, and the ability to support multiplexing of cells from an external source with cells constructed or retrieved internally by a cell processor.

An exemplary cell processor in accordance with the present invention overcomes the above-noted problems associated with two-dimensional cell scheduling by in effect removing the second dimension and pushing service requests out in time if a targeted slot is occupied. As a result, each time slot will generally have only a single request pending and subsequent scheduling operations will have a significantly more accurate representation of time. Although a one-dimensional scheduling approach in accordance with the present invention generally utilizes a search of a primary scoreboard representing the cell schedule, the invention provides techniques for performing this scoreboard search in an efficient manner such that overall system throughput performance is improved. For example, an exemplary cell scheduling system in accordance with the invention can find an available cell location in a given range of possible locations within an acceptably bounded time period, by utilizing the secondary scoreboard previously described.

Another advantage of the present invention is that various specialized circuits may be used to handle ATM-specific tasks in conjunction with a CPU in the cell processor. These specialized circuits can offload many time-critical functions from the cell processor CPU to thereby deliver greatly enhanced levels of performance and functionality. An example of such a specialized circuit is the hardware-based traffic shaping mechanism referred to herein as the cell scheduling system (CSS). Although the CSS generally relies on the cell processor CPU for direction regarding required traffic patterns, it can be configured to manage all traffic shaping functions of the ATM cell processing operation. This provides users with the benefits of algorithmic traffic shaping without significant decreases in overall processor throughput performance.

The above-noted features and advantages of the present invention result in a cell processor which in a given embodiment can, for example, (1) operate at speeds of up to 600 Mb/s or more; (2) operate in accordance with the ATM Forum Traffic Management specification for available bit rate (ABR) service; (3) operate as a self-contained device managing concurrent constant bit rate (CBR), variable bit rate (VBR) and ABR connections to thereby free host processing resources for other tasks; (4) support rate-based and quantum flow control based ABR service with algorithmic implementation of traffic shaping; (5) perform in ATM layer processing applications; (6) perform virtual path tunneling whereby a series of VBR, ABR or unspecified bit rate connections can be tunneled across CBR virtual path connections; and/or (7) manage, schedule and traffic shape multiple transmission links simultaneously using multiple scoreboards. These and numerous other features and advantages of the invention provide system designers with a common, reprogrammable cell processor architecture for their ATM products. The present invention thus provides lower ATM product development costs, shorter development cycles and a substantial reduction in the cost of support equipment.

BRIEF DESCRIPTION OF THE DRAWINGS

FIG. 9 illustrates a tunneling operation which may be performed in the ATM cell processor of FIG. 2 in accordance with the present invention.

DETAILED DESCRIPTION OF THE INVENTION

The present invention will be described in a number of different sections as set forth in the following brief outline.

1. ATM Cell Processing System
   1.1 Control Memory 22
2. ATM Cell Processor Architecture
   2.1 General Overview
   2.2 Central Processing Unit (CPU) 50
   2.3 Load Multiple Instruction with Automatic Memory Update
   2.4 Modulo Arithmetic with Branching on Modulo Portion of Result
   2.5 Cell Buffer RAM (CBR) 52
   2.6 CBR Memory Space Gathering Protocol
3. Operation of the CSS 56 Using Primary Scoreboard/ Connection ID Table
4. Scheduling Instructions
   4.1 PUSHC Instruction
   4.2 PUSHF Instruction
5. Servicing Instructions
   5.1 POPC Instruction
   5.2 POPF Instruction
6. Additional Details of the Cell Scheduling Process
   6.1 Bounded Primary Scoreboard Search Times
   6.2 CSS Instruction Buffer
   6.3 Addressing the Primary Scoreboard and Connection Id Table
   6.4 Initializing the Primary Scoreboard
   6.5 Selecting a Primary Scoreboard Size
   6.6 Use of Multiple Schedules
7. Example of CSS Operation
8. Bounded Primary Scoreboard Searching Using a Secondary Scoreboard
9. Pre-Reservation of Bandwidth for CBR Connections
10. Tunneling
11. Fully Independent Rates
12. Inherently Fair Bandwidth Allocation
13. Multiple Layers of Scheduling Requests
14. External ATM Cell Multiplexing Although illustrated herein in conjunction with the scheduling of asynchronous transfer mode (ATM) cells on one or more transmission links, the present invention is more generally applicable to the scheduling of cells onto any bandwidth allocating resource. For example, a first-in-first-out (FIFO) queue could be placed between an ATM cell processor and a physical transmission link in a given embodiment such that the cells are scheduled into the queue rather than directly onto the link. In addition, cells may be scheduled in accordance with the invention through an ATM switching fabric, a backplane or another suitable device rather than directly onto a link. The term "transmission link" as used herein should therefore be construed broadly to include any bandwidth allocating resource, including those in which queues, switching fabrics, backplanes or other devices are located between a cell processor and a physical transmission link. It should also be noted that the present invention may be utilized in an ATM switching system to shape cell streams. For example, a cell scheduling system in accordance with the invention could be used to indicate when a cell should be sent rather than when a cell should be constructed from a given packet. The cell scheduling system and other associated cell processing elements could be located at either the input or the output of an ATM cell switching system.

1. ATM Cell Processing System

Figure 1A:
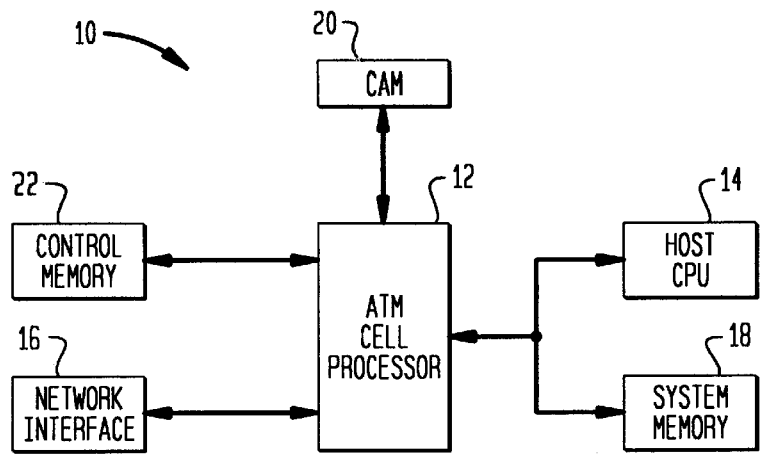
FIG. 1A is a block diagram of an asynchronous transfer mode (ATM) cell processing system.

FIG. 1 A shows an exemplary asynchronous transfer mode (ATM) cell processing system 10 in accordance with the present invention. The system 10 includes an ATM cell processor 12 which in this embodiment is configured to interact with a host central processing unit (CPU) 14 of a host computer. The cell processor 12 receives and transmits ATM cells over an ATM communication network via a network interface 16. The cell processor 12 may communicate with the network interface 16 via a UTOPIA port interface to be described in greater detail below. The network interface 16 may represent a physical layer control device such as a synchronous optical network (SONET) interface device. The cell processor 12 accesses a system memory 18, a content addressable memory (CAM) 20 and a control memory 22 in order to process ATM cells in a manner to be described below. The control memory 22 is also referred to herein as a Fast Access to Software Tables (FAST) control memory or simply a FAST memory, and is used to hold the software tables or other data structures used to process cells and to service connections. The cell processor 12 is designed for use in high-speed ATM cell processing applications, and is configured to provide cell throughput at speeds typically associated only with fully hard-wired approaches while providing the flexibility benefits of a programmable device. For example, the cell processor 12 can be readily configured to operate at speeds of up to 600 Mb/s or more while providing full programmability of numerous operating parameters such as cell scheduling and tunneling. It should be understood that the interconnection of cell processor 12 with other elements of system 10 is merely illustrative and that numerous alternative configurations may be utilized in a given application.

1.1 Control Memory 22

Figure 1B:
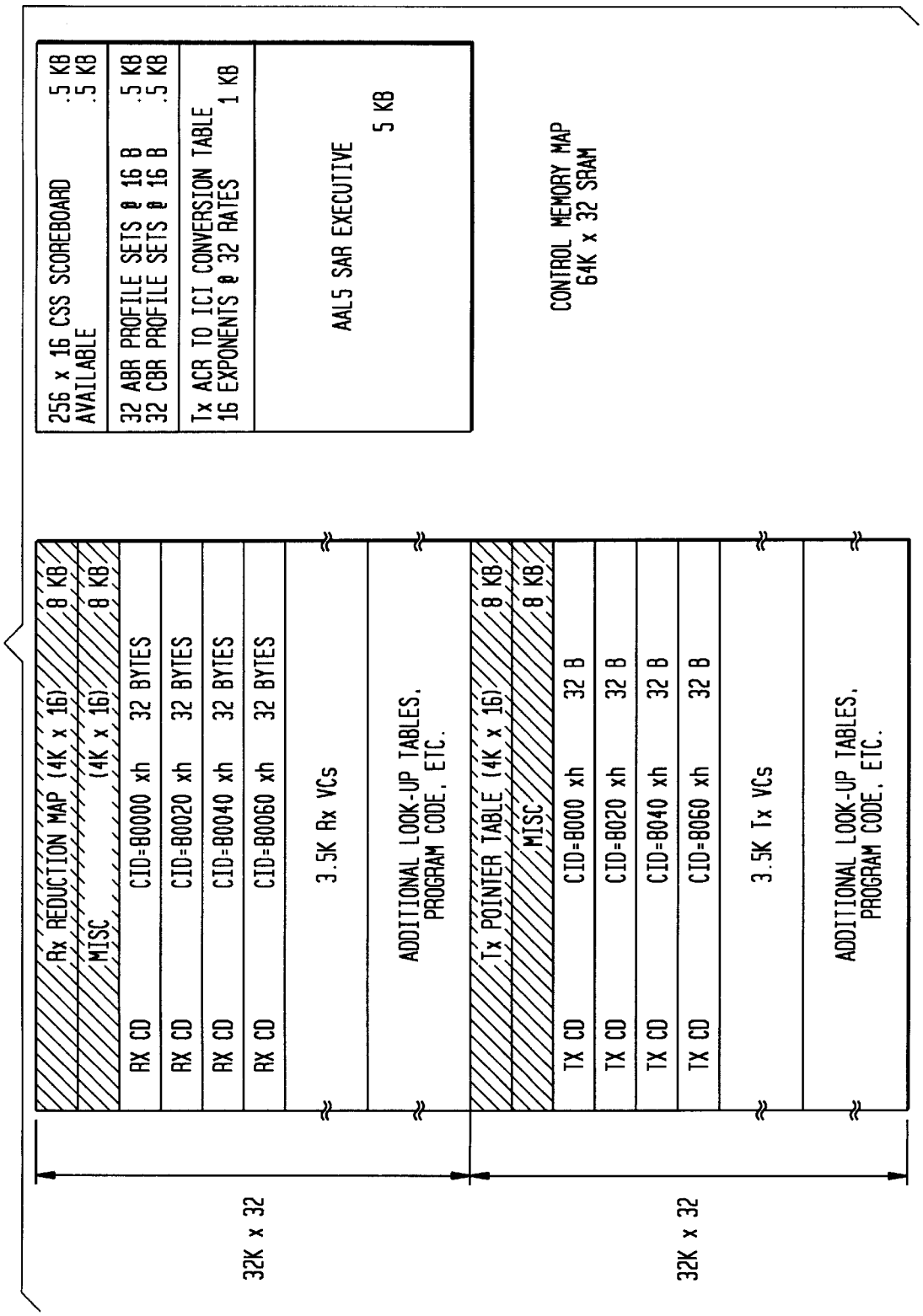
FIG. 1B shows an exemplary control memory configuration suitable for use in the cell processing system of FIG. 1A.

FIG. 1B shows a possible implementation of the FAST control memory 22 in greater detail. This exemplary control memory is configured as a 64K×32 static RAM (SRAM) which includes an upper 32K×32 portion and a lower 32K×32 portion. The ATM cell processor 12 provides low-latency access to the contents of control memory 22 via a FAST memory controller to be described below. The contents of control memory 22 may include virtual connection descriptors (CDs), program code, traffic shaping memory, as well as look-up tables such as the primary scoreboards and connection ID tables to be described in greater detail below. The upper 32K×32 portion includes an 8 Kbyte receiver reduction map, an 8 Kbyte miscellaneous portion, and 3.5 Kbytes of receive CDs. The receive CDs each include information utilized by the cell processor 12 to process receive cells for the corresponding connection. The 8 Kbyte miscellaneous portion includes a 256×16 primary scoreboard, 32 available bit rate (ABR) profile sets, 32 constant bit rate (CBR) profile sets, a transmit available cell rate (ACR) to inter-cell emission interval (ICI) conversion table, and an ATM adaptation layer 5 (AAL5) segmentation and reassembly (SAR) executive. The lower 32K×32 portion includes an 8 Kbyte transmit pointer table, an 8 Kbyte miscellaneous portion, and 3.5 Kbytes of transmit CDs. The transmit CDs each include information utilized by the cell processor 12 to generate transmit cells for the corresponding connection. Although the exemplary control memory 22 of FIG. 1B is illustrated as including space for a primary scoreboard, it may be preferable in many applications to store the primary scoreboard in an on-chip memory of the cell processor 12 rather than in an external memory.

2. ATM Cell Processor Architecture 2.1 General Overview

Figure 2:
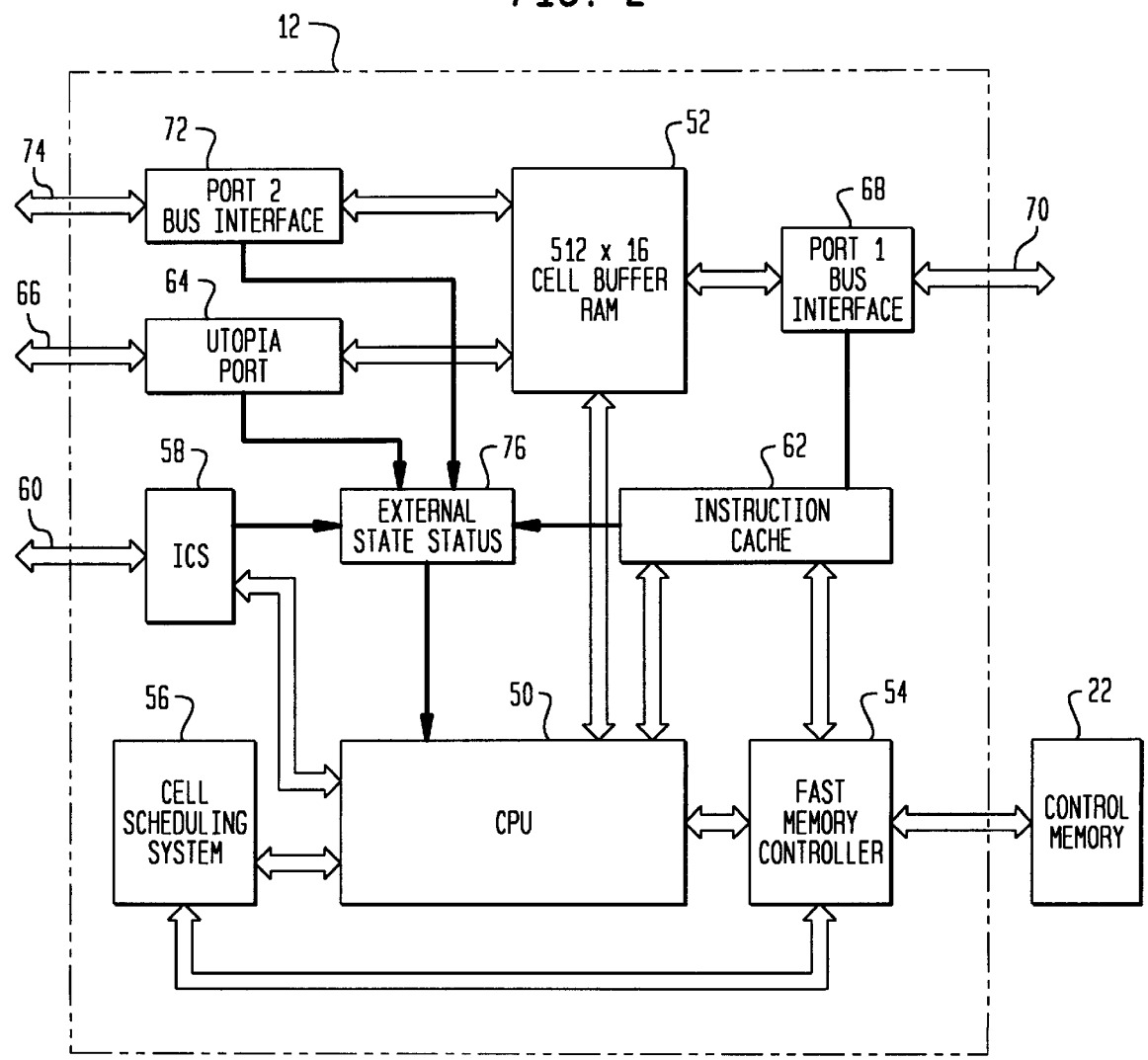
FIG. 2 is a detailed block diagram of an ATM cell processor in accordance with the present invention.

FIG. 2 is a block diagram of an exemplary ATM cell processor 12 in accordance with the invention. The cell processor 12 includes a CPU 50 which serves as an ATM network protocol processor. The CPU 50 communicates with a 512×16 cell buffer random access memory (RAM) 52, a FAST memory controller 54 which accesses the FAST control memory 22 of system 10, a cell scheduling system 56, an inter-chip signal (ICS) system which provides system status via an external bus connection 60, and a processor instruction cache 62. The cell processor 12 includes a UTOPIA port 64 for connection to an ATM network via a physical layer (PHY) device such as a SONET interface device. The term UTOPIA refers to a standard handshake/data transfer protocol defined by the ATM Forum for communication between an ATM layer device, such as ATM cell processor 12, and a physical layer device, such as a SONET interface. Alternative protocols could also be used to interface processor 12 with an ATM network. The cell processor 12 further includes a Port 1 bus interface 68 which may be a high performance 32-bit direct memory access (DMA) interface and a Port 2 bus interface 72 which may be a general purpose 16-bit DMA interface. The Port 1 interface 68 may be connected via bus connection 70 to the host CPU of system 10 and the Port 2 interface 72 may provide an interconnection via bus connection 74 to system memory 18 and/or CAM 20 of system 10. The CPU 50 may be a soft-wired ATM network protocol (SWANS) processor developed by Maker Communications, Inc. of Waltham, Mass., assignee of the present invention. The cell processor 12 may be implemented as an application-specific integrated circuit (ASIC) or other suitable digital data processor. An exemplary single-package cell processor is the part number MXT3010 developed by Maker Communications.

2.2 Central Processing Unit (CPU) 50

The CPU 50 will now be described in greater detail. The CPU 50 may be configured to utilize a limited instruction set in accordance with reduced instruction set computation (RISC) techniques. The particular instructions utilized may also incorporate conventional complex instruction set computation (CISC) techniques to thereby provide additional flexibility. By combining the pipeline speeds of a RISC processor with the instruction set power of a CISC processor, the CPU 50 can attain throughput performance comparable to that of fully hard-wired devices at processing speeds on the order of 600 Mb/s or more. The CPU 50 utilizes instructions and data access methods particularly well-suited to ATM applications. For example, the cell scheduling instruction push cell (PUSHC) and cell servicing instruction pop cell (POPC) to be described below are ATM-specific instructions that can initiate a complex task in a single processor instruction cycle. These and other specialized instructions provide a significant performance gain relative to prior art ATM processing systems.

The CPU 50 may be a 16-bit processor which includes a 16-bit arithmetic logic unit (ALU) and utilizes a 32-bit instruction word in halfword increments. Although the term "halfword" as used herein generally refers to a 16-bit structure, or one-half of a 32-bit word, the various aspects of the invention described with reference to halfwords can of course utilize data structures of other sizes. The configuration of CPU 50 as a 16-bit processor exploits the fact that a majority of the data structures processed in ATM cell processing applications are 16 bits or less in size, and that those ATM data structures which are greater than 16 bits are often comprised of two or more independent fields, each of which is 16 bits or less. A 16-bit processor generally allows for more efficient compacting and processing of these ATM data structures, and provides a high pipeline frequency while maintaining cost effectiveness. For example, all non-dispatched instructions for CPU 50 may be designed to execute in a single clock cycle. The CPU 50 may include an on-chip phase-locked loop (PLL) or other frequency-multiplying mechanism which doubles or otherwise increases the frequency of the input clock signal, to thereby enable the CPU 50 to operate at a multiple of the input clock frequency. The CPU 50 can also utilize delayed branching techniques to ensure that branch instructions operate at an effective cycle rate of one instruction per cycle. Dispatched instructions, such as the PUSHC and POPC instructions to be described in greater detail below, generally require more than one cycle to complete but their execution occurs outside of the CPU 50 and therefore the processor 50 is not stalled while the dispatched instructions execute. The ALU can make use of feedback in that an instruction that modifies a given register can be followed immediately in many situations by an instruction that accesses that same register.

The CPU 50 in an exemplary embodiment includes 64 16-bit registers. Thirty-two of these registers constitute a general purpose register file, while the remaining thirty-two are considered specialized or hardware registers. The ALU instructions operate on the contents of two source registers, or on the contents of a source register and an immediate or available value.

Certain registers in the CPU 50 allow the ATM cell processor 12 to implement a two-way communication channel with the host CPU 14. These registers include two 16-bit COMMIN registers that allow the host CPU 14 to write command, status, address and other information to the processor 12, and two 16-bit COMMOUT registers that allow the host CPU 14 to read command, status, address and other information from the processor 12. The COMMIN and COMMOUT registers of the processor 12 are accessed by the host CPU 14 via the Port 1 bus interface 68.

A CSS configuration register is included in the CPU 50. The CSS configuration register is typically initialized by software operating ATM cell processor 12 before the CSS 56 is used. The CSS configuration register indicates the base address in control memory 22 of a connection identifier (ID) table and a primary scoreboard, both of which are used in cell scheduling operations and will be described in greater detail below. This register also indicates the size of the scoreboard to be used in a given scheduling operation.

An assigned cell flag register (ACFR) is included in CPU 50 and is used in cell scheduling and servicing operations. For example, the ACFR is accessed by the CSS 56 at the conclusion of a POPC operation. The CSS 56 copies the scoreboard bit targeted by the POPC operation into the ACFR, and the CPU 50 can then examine the ACFR to determine if a requested cell has been properly scheduled.

Mechanisms for inter-chip communications are provided by the CPU 50. An external state status device 76 provides access via the ICS 58 and the UTOPIA port 64 to signals which allow the CPU 50 to sense the state of external elements, subsystems and the like to processor 12 and to make processing decisions based on this state information. The processor 50 can also provide internal state information to the external elements and subsystems via the ICS 58.

A number of conditional and unconditional branch instructions are provided in the CPU 50. A conditional branch instruction may base its branch decision on the logic state of one of a number of external state signals (ESSs) provided as inputs to the CPU 50 via the external state status device 76. The ESSs are connected to internal state signals that are read by the CPU 50 in order to make appropriate cell processing decisions. For example, branch instructions may specify a target address to branch to if the specified ESS is set to an appropriate logic state. An unconditional form of a branch instruction can be selected when an instruction field option (IFO) is left off of the corresponding instruction word in the source file.

The CPU 50 may be configured to implement a technique referred to as delayed branching in which an extra CPU clock cycle is provided to execute a branch instruction without an accompanying reduction in throughput. When a branch instruction is encountered, the instruction immediately following the branch, referred to as the committed slot instruction (CSI), is fetched and entered into the execution pipeline while the branch instruction is processed. If the branch condition evaluates as true, or if an unconditional branch is used, the execution of the target instruction follows execution of the CSI as long as a never execute (NE) operator is not specified. The NE operator is generally only specified with an unconditional branch, that is, one in which the IFO is not present. If the branch condition evaluates as false, the CSI may or may not be executed depending on whether the user specified a conditional execution (C) operator with the branch. The C operator, if present, allows the user to specify that the CSI will not be executed if the branch is not taken. Certain restrictions may be applied regarding which instructions can be placed in the committed slot of a branch. For example, the committed slot of a branch may be restricted so as to not contain an ALU conditional branch or another branch instruction unless the unconditional form of a branch is used with an NE operator.

The CPU may be configured to utilize a predictive branching technique in which a branch decision based on the result of an ALU operation is made in advance of the availability of the result. The CPU 50 implements predictive branching by first attempting to predict the result of the branch condition and then executing a subroutine which would be executed if the prediction were true. If the CPU later determines that its prediction was incorrect, which it can usually do within about two to three CPU cycles, it ends execution of the undesired subroutine and redirects program execution to the correct subroutine. In an exemplary embodiment of the invention, the ALU conditional branching capability is incorporated into the ALU instructions. Because this arrangement may not leave sufficient space in the instruction word to specify a branch offset, a fixed branch offset on the order of four instruction words may be used. For example, if the CPU decides to take a given branch, it will branch to a position approximately four instructions away from the branch instruction. If the branch is not taken, the CPU continues with sequential instruction execution. As noted above, the committed slot instruction (CSI) associated with the branch instruction may be executed regardless of whether or not the branch is taken.

The CPU 50 uses load and store instructions to transfer data between CPU registers and the cell buffer RAM (CBR) 52. A typical load instruction will generally fetch one or two halfwords of data from the CBR 52 and write the data into an appropriate CPU register. A typical store instruction will generally write the contents of one or two CPU registers into the CBR 52. The CPU 50 can thus be configured to allow for the reading and writing of 16-bit and 32-bit data structures from the CBR 52 using a single instruction. Load scheduling is used to allow the CPU 50 to continue with program execution while awaiting data from the CBR 52. The store instructions operate in conjunction with a write buffer in order to allow the CPU 50 to continue with program execution while data is written into the CBR 52.

As noted above, the CPU 50 implements a number of instructions specifically for the purpose of scheduling and servicing ATM cells for transmission. These instructions include push cell (PUSHC) and pop cell (POPC) instructions. The PUSHC instruction is executed by the CPU 50 to cause the CSS 56 to search a primary scoreboard stored in control memory 22 in an effort to find and reserve a time slot for transmission of a cell. The POPC instruction is executed by CPU 50 to direct the CSS 56 to retrieve from control memory 22 a connection ID associated with a specified time slot, to set the above-noted assigned cell flag register (ACFR) if the scoreboard bit was found set, and to clear the corresponding primary scoreboard bit to thereby free the time slot location. These cell scheduling and servicing operations will be described in greater detail below in conjunction with FIGS. 4–7.

2.3 Load Multiple Instruction with Automatic Memory Update

The CPU 50 can initiate a burst transfer of data from FAST control memory 22 directly into its internal register file by executing a Load Multiple Fast Memory (LMFM) instruction. An exemplary LMFM instruction may utilize the following format:

LMFM rd @rsa/rsb #HW {LNK} in which rd refers to an initial destination register in CPU 50; rsa and rsb are CPU registers containing address bits (18:16) and (15:0), respectively, of the data block to be transferred from the FAST control memory 22; #HW refers to the total number of 16-bit halfwords, assuming a 32-bit memory word, to be loaded by the LMFM instruction; and {LNK} refers to an instruction field option (IFO) which when present indicates that a linking function is to be invoked. The linking function directs the FAST memory controller 54 to link the CPU registers loaded in response to the LMFM instruction to the locations in control memory 22 from which the register contents were read. The link may be implemented by storing in the FAST memory controller 54 or elsewhere in processor 12 the base address in control memory 22 of a given retrieved data block. In accordance with an automatic memory update feature of the present invention, ALU or other instructions that modify these CPU registers can specify an update memory (UM) IFO to thereby cause the modifications to be written back to control memory 22. The previously-stored base address of the retrieved data block is used along with the CPU register number to identify a particular control memory location or locations to which modifications will be written back. In addition, a copy of the first halfword read from control memory 22 may be written by the memory controller 54 into a FAST memory first word shadow register in controller 54 if the LNK IFO is present. A software program executed by CPU 50 can then place a service routine address in the first halfword of a channel descriptor and use a BF (Branch FAST memory first word shadow register) instruction to branch to the address of the first word shadow register.

The LMFM instruction allows the CPU 50 to select a number of halfwords to be retrieved from the control memory 22. The FAST memory controller 54 retrieves the requested number of halfwords from the control memory 22 and writes these halfwords directly into the CPU register file starting at register rd. The LMFM instruction in one embodiment can initiate a burst transfer of up to 32 bytes of data from control memory 22. The FAST memory controller 54 writes halfwords returned from control memory 22 into the CPU register file one halfword at a time, starting with register rd and continuing with registers rd+1, rd+2, and so on. The controller 54 will continue transferring data from control memory 22 until a quantity #HW of halfwords have been retrieved. While the transfer is underway, the CPU 50 is free to continue program execution but generally should not attempt to access a register that is pending modification by the burst transfer operation. The halfwords are made available to the CPU 50 as they are returned from control memory 22.

The CPU 50 need not wait for the entire transfer to be completed before accessing the returned halfwords. By ordering the fields of a data structure in the same order that they are processed, the CPU 50 can retrieve a 32-byte data structure using a single instruction and can continue to process the retrieved data as it is received from control memory 22. If the CPU 50 attempts to access a register that is pending modification by an active LMFM instruction, it will stall until the new value for that register is returned from control memory 22. Assuming that the memory controller 54 is available, that is, not busy with write buffer access, cell scheduling or servicing functions or other operations, the first halfword read in response to a given LMFM instruction will generally be available for subsequent processing approximately five CPU clock cycles after the LMFM instruction is executed. Successive halfwords will then generally be made available every CPU cycle thereafter until the burst transfer is completed. To avoid CPU stalls, an instruction that accesses the destination register rd of a given LMFM instruction should therefore be separated from the LMFM instruction by about five CPU cycles, while an instruction accessing rd+1 should be separated from the LMFM instruction by about six CPU cycles, and so on. If the FAST memory controller 54 is busy with a write buffer access, a cell scheduling or servicing function, or other operation, the delay may increase slightly. Such an increase in delay can be accommodated in many applications by suitable selection and arrangement of processing instructions.

As noted above, the automatic memory update feature allows the CPU 50 to specify within, for example, an ALU instruction operating on the contents of a given CPU register that the result of the operation is to be written back to the location in control memory 22 which supplied the register contents. This allows the CPU 50 to update a retrieved data structure without executing separate store instructions. The automatic memory update feature is implemented in an exemplary embodiment by specifying the above-noted LNK IFO in an LMFM instruction, such that the referenced data block of control memory 22 is linked to the LMFM destination registers, and then including an update memory (UM) IFO in an ALU instruction. For example, execution of an LMFM instruction with rd=R16 and the LNK IFO specified causes registers R16 through R31 to be linked sequentially to the 16 halfwords of the control memory block addressed by CPU registers rsa and rsb. As noted above, the link may be implemented by storing in memory controller 54 or elsewhere in processor 12 the base address in control memory 22 of the retrieved data block. The CPU register number may be used as an index into the control memory locations which supplied the retrieved data block, such that each combination of the base address and a register number specifies a particular control memory location. For example, assuming the link begins with halfword zero of an addressed N halfword block in an embodiment having 32 general purpose 16-bit CPU registers, N may be uniquely determined by the choice of register rd, such that if rd is R16, N=16; if rd is R24, N=8, if rd is 28, N=4, and if rd is 30, N=2. In this example, registers R16, R24, R28 or R30 may be selected for rd with an LMFM instruction that specifies the LNK IFO. The stored base address of the retrieved N halfword block in conjunction with the register number are then used to implement memory update.

The above-described LMFM instruction together with the automatic memory update feature can reduce the length of a typical cell processing routine by as many as 32 CPU cycles. This provides significant advantages relative to prior art cell processors in terms of reducing the latency commonly associated with accessing control information from SRAM or other types of control memory. It should be noted that although the automatic memory update feature is particularly well-suited for use with ALU instructions, this feature may also be utilized with other types of CPU instructions.

2.4 Modulo Arithmetic with Branching on Modulo Portion of Result

The ALU in the CPU 50 can be configured to support modulo arithmetic operations. A MOD IFO in an ALU instruction may be used to specify the number of bit positions, right to left, after which the result of an ALU operation will be truncated. For example, an ALU instruction such as:

ADD R0, 04×h, R5 MOD16 directs the ALU to add 04×h to the contents of register R0, store the result in register R5, and to perform the addition operation modulo 16. A modulo 16 addition or substraction operation will not affect the R0(15:4) bits regardless of whether or not there is a carry out or borrow out of the R0(3) bit. The result written into R5(15:4) will be the value present in R0(15:4), while R5(3:0) will receive the (3:0) bits of the addition or substraction operation. A given user can select the MOD IFO as any value from 2 to 64K in an exemplary embodiment. The value of 64K may be used as a default value selected by a software compiler to provide full 16-bit operation if no MOD IFO is present in the ALU instruction.

In accordance with the invention, when the MOD IFO is specified within an ALU instruction, certain conditional branch instructions may be evaluated based on only the modulo portion of the 16-bit result and/or on the carry out of the most significant bit (MSB) position of the modulo portion. These conditional branch instructions include, for example, Branch on Zero (BZ), Branch on Non-Zero (BNZ), Branch on Less than Zero (BLZ), Branch on Overflow (BO), Branch on No Overflow (BNO), Branch on Carry (BC) and Branch on No Carry (BNC). The use of BZ and BNZ conditional branch instructions based on only the modulo portion of the result allow a user to, for example, test for the occurrence of a page or block boundary crossing in a memory pointer that has a non-zero base address.

2.5 Cell Buffer RAM (CBR) 52

Figure 3A:
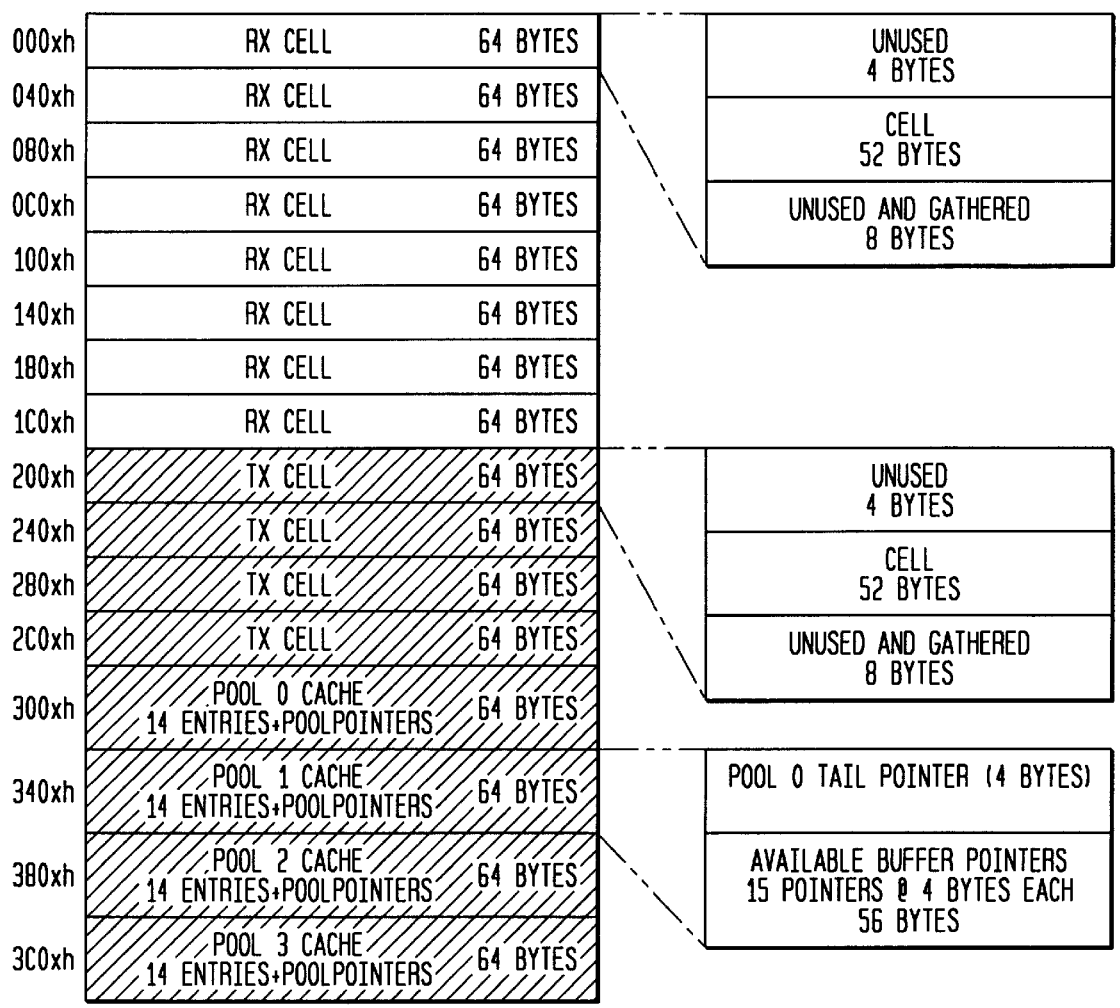
FIG. 3A shows an exemplary cell buffer RAM (CBR) configuration suitable for use in the cell processor of FIG. 2.

FIG. 3A illustrates the cell buffer RAM (CBR) 52 of the ATM cell processor 12. The CBR 52 is used to buffer cells in both the transmit and receive directions and is configured in this embodiment into 16 64-byte blocks referred to as cell buffers. ATM cells may be written into the RX CELL blocks of CBR 52 as they are received from a PHY layer device such as the SONET interface 16 via the UTOPIA port 64. ATM cells may be constructed in the TX CELL blocks of CBR 52 before being transmitted to the physical layer. In this exemplary embodiment, cells are written into or constructed in the cell buffers such that byte 0 of the cell resides in byte 4 of the cell buffer. This leaves 4 unused bytes at the front end of a given cell buffer as shown in FIG. 3A. The CPU 50 may write specialized information, such as a user-specific routing tag suitable for use in switching applications, into these unused bytes at the front end of the cell buffer. At system initialization, the CBR 52 is segmented into sections for receive cell storage, transmit cell construction and buffer pool caching as shown in FIG. 3A. A given cell in this embodiment generally occupies no more than the top 56 bytes of a given 64-byte cell buffer. This leaves approximately 8 bytes of RAM at the bottom of each cell buffer. These unused cell buffer portions can be efficiently accessed using a memory space gathering protocol to be described in greater detail below. It should be noted that in the exemplary embodiment of FIG. 3A, the stored cells are shown as occupying 52 bytes rather than 53 bytes. This is because in this embodiment it is assumed without limitation that a header error control (HEC) byte associated with a given cell is checked and discarded prior to storage of that cell.

2.6 CBR Memory Space Gathering Protocol

Figure 3B:
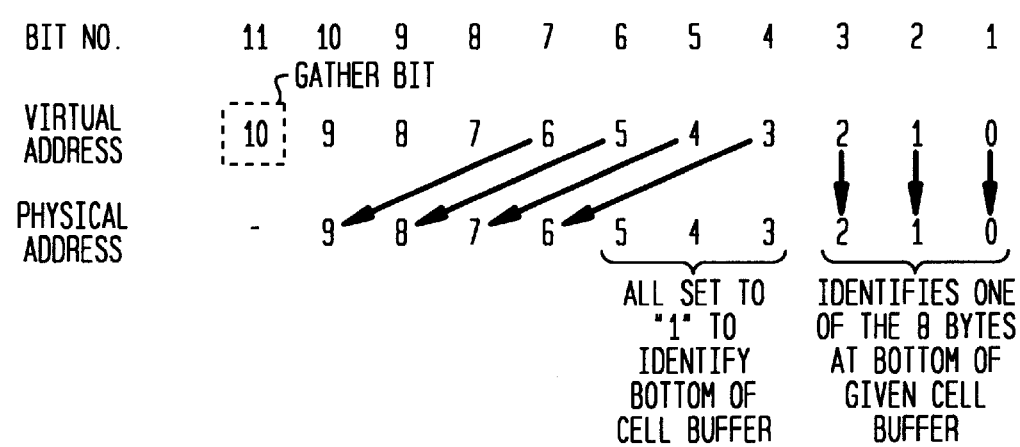
FIGS. 3B and 3C illustrate the operation of an exemplary CBR memory space gathering protocol in accordance with the invention.
Figure 3C:
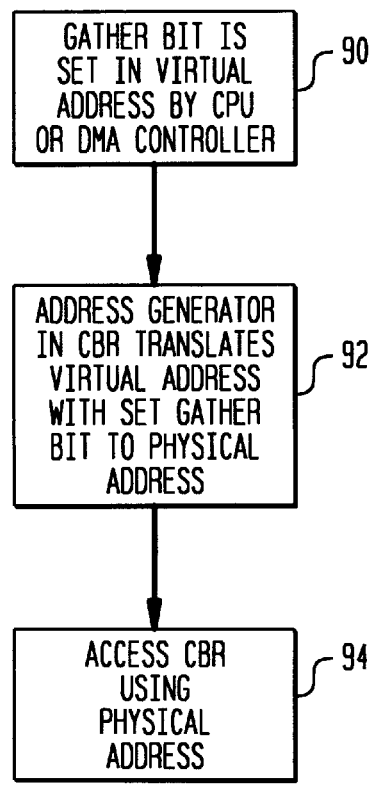

FIGS. 3B and 3C illustrate the operation of an exemplary memory space gathering protocol in accordance with the invention. The protocol allows unused memory spaces in the cell buffers of FIG. 3A to be accessed as a "virtual" contiguous space. As noted above, the exemplary CBR 52 of FIG. 3A includes 16 cell buffers of 64 bytes each, or 1024 bytes. A total of 10 bits are required to address each of the 1024 bytes. The space gathering protocol in one exemplary embodiment utilizes an 11-bit virtual address shown in FIG. 3B in which the first 7 bits identify one of the bytes in a virtual contiguous space made up of the 8-byte unused portions at the bottom of each of the 64-byte cell buffers. The 11th bit of the virtual address is referred to as a gather bit and when set identifies the corresponding address as a virtual address and therefore as an address referring to a byte in the virtual contiguous space. The space gathering protocol translates an address having a set gather bit into a physical address. The physical address identifies a particular byte in the virtual contiguous space which includes the unused portions of the 16 cell buffers in CBR 52.

FIG. 3C shows a flow diagram illustrating an exemplary set of steps for processing addresses to implement the space gathering protocol. In step 90, the gather bit is set for a virtual address which identifies a CBR byte falling within the unused 8-byte portion at the bottom of a 64-byte cell buffer. The gather bit may be set by the CPU 50, a DMA controller associated with bus interface 68 or 72, or by another suitable address adjustment mechanism. The virtual address with set gather bit is then supplied to the CBR 52. In step 92, an address generator within the CBR 52 translates virtual addresses with set gather bits into physical addresses. FIG. 3B shows the translation from a virtual address to a physical address suitable for use with the exemplary CBR 52 of FIG. 3A. The first three bits of the 10-bit physical address are mapped directly from the first three bits of the 11-bit virtual address. These bits identify one of the eight bytes at the bottom a particular cell buffer in CBR 52. The next three bits of the physical address are set to a logic '1' regardless of the virtual address such that the physical address will always skip to the bottom 8-byte portion of a given cell buffer. The final four bits of the physical address are mapped from the third, fourth, fifth and sixth bits of the virtual address as shown in FIG. 3B. The gather bit is discarded after it directs the address generator of CBR 52 to provide the above-described translation of a given virtual address to a physical address. In step 94, the virtual contiguous memory space of CBR 52 is accessed using the physical address.

The above-described translation allows unused portions of the 64-byte cell buffers to be accessed as a contiguous memory space. The present invention thus permits data accesses which specify particular addresses to trigger the CPU 50 or DMA controller to form the contiguous memory space by suitably altering the actual addresses of the unused bytes. The particular translation from virtual to physical address will of course vary depending upon the dimensions of the cell buffers and the relative locations of the unused memory spaces to be gathered. Alternative embodiments could provide several separate gather spaces by adjusting the number of gather bits used in the virtual address. In addition, it should be noted that the position of the gather bit or bits within a given address may vary depending on the memory size.

3. Operation of the CSS 56 Using Primary Scoreboard/Connection ID Table

The operation of the CSS 56 will now be described in greater detail. The cell scheduling and servicing operations in ATM cell processor 12 are in this embodiment implemented as a combination of both algorithmic and hardware-assisted functions. The algorithmic portion of the cell scheduling function is implemented by the CPU 50. The hardware-assisted portion is performed by the CSS 56. The cell scheduling process may be thought of as managing an ATM transmission link or other bandwidth allocating resource as a repetitive container of cells. Every cell time, the next location in the cell schedule represented by the primary scoreboard is checked. If the location is reserved, a cell is constructed and sent for the virtual connection (VC) that reserved the location. If the location is not reserved, an IDLE cell may be sent to maintain back pressure, that is, to prevent the cell processor from proceeding too quickly through the schedule.

Figure 4:
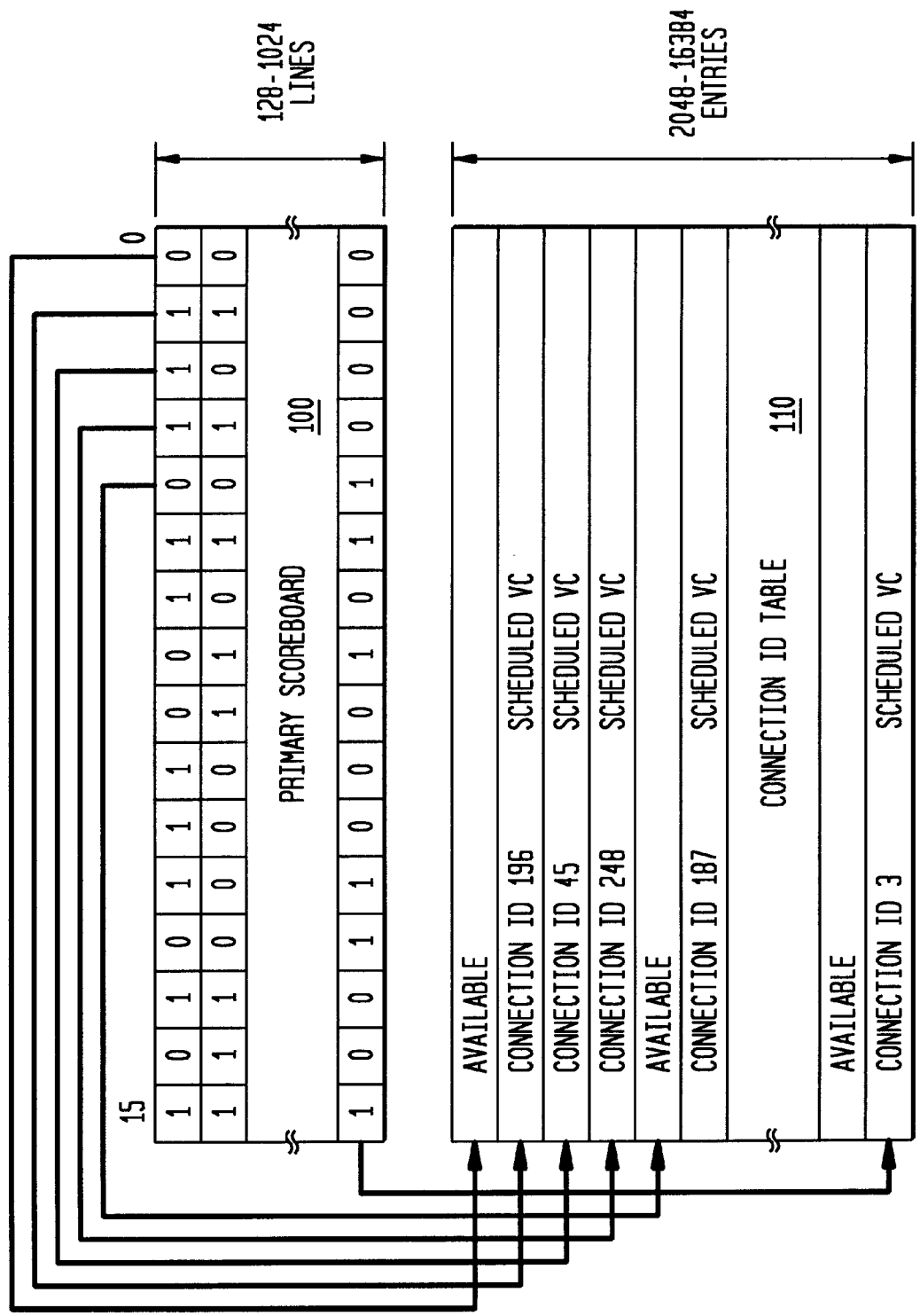
FIG. 4 shows an exemplary primary scoreboard and connection ID table suitable for use in a cell scheduling operation in accordance with the present invention.

FIG. 4 illustrates an exemplary primary scoreboard 100 and connection identifier (ID) table 110 which the ATM cell processor 12 may create in the control memory 22. The primary scoreboard 100 and connection ID table 110 are generally maintained by the CPU 50 working in conjunction with the CSS 56. The CSS 56 modifies the primary scoreboard and connection ID table stored in control memory 22 in response to cell scheduling and servicing requests issued by the CPU 50. The primary scoreboard 100 represents the cell schedule and includes a group of bits arranged in a number of 16-bit lines. Although in this embodiment the primary scoreboard 100 includes between 128 and 1024 of these 16-bit lines, other numbers and sizes of lines may be used in alternative embodiments. The connection ID table 110 includes a 16-bit entry for each of the bits in the primary scoreboard 100, and thus includes between 2048 and 16384 entries depending upon the exact number of lines in the scoreboard 100. Each 16-bit entry could be expanded to include 32 bits or another suitable number of bits in alternative embodiments. Each entry in the connection ID table 110 represents a cell time slot in a given ATM transmission link, and either contains a connection ID for a given scheduled VC, or contains no connection ID if the corresponding cell time slot is unscheduled and thus available.

A scoreboard in accordance with the present invention may be any group of bits or other information elements indicative of cell scheduling operations. Although illustrated herein using bits, a given scoreboard may utilize other arrangements of information elements, including multi-bit information elements, to indicate cell scheduling and servicing status. For example, a pair of bits or other suitable multi-bit structure could be used to represent each cell time slot, rather than a single bit for each time slot as in the illustrative embodiments. The term "scoreboard" as used herein should be understood to include these and other alternative groupings of information elements. A scoreboard in accordance with the invention may be stored in an array of memory words, a look-up table, or in any other suitable organization of memory locations.

As noted above, the cell scheduling operation of the present invention may be thought of as dividing the ATM cell capacity of a given system transmission link into a periodic container of cells. The boundary of the periodic container relative to the transmission convergence framing structure is generally arbitrary. Each location or cell time slot within the periodic container in the exemplary embodiment of FIG. 4 corresponds to a single bit in the primary scoreboard 100 and thus a single entry in the connection ID table 110. The number of bits in the primary scoreboard 100 equals the number of entries in the connection ID table 110 and also equals the number of cell time slots in the periodic container. Successive bits in the primary scoreboard 100 and successive locations in the connection ID table 110 represent successive cell time slots on the ATM transmission link. The user may set the periodic container size in this exemplary embodiment to any number of cells between 2048 and 16384. Other numbers of cells could also be used as required in a given application.

A cell time slot on the ATM transmission link is marked as having been scheduled for a specific connection if the corresponding primary scoreboard bit is set to a logic '1'. A cell time slot is considered unscheduled and therefore available if the corresponding primary scoreboard bit is a logic '0'. The primary scoreboard bits are set and cleared by the CSS 56 in response to PUSHC and POPC instructions executed by the CPU 50.

The CPU 50 initiates a scheduling operation by executing a PUSHC instruction issued by a user. The PUSHC instruction specifies a 16-bit connection ID and a target location within the connection ID table 110. The CSS 56 responds to the PUSHC instruction by searching the primary scoreboard 100 looking for the first bit indicating an available cell time slot at or after the bit corresponding to the target location. If an available cell time slot is not found by the last bit of the primary scoreboard, the CSS 56 continues the search from the beginning of the scoreboard. When the CSS 56 finds an available cell time slot, it sets the corresponding bit in the primary scoreboard and writes the 16-bit connection ID into the corresponding entry of the connection ID table 110. The user may supply any 16-bit value as a connection ID. In general, the connection ID will serve as the base address in control memory 22 of the connection descriptor (CD) for the corresponding VC.

The PUSHC instruction may be implemented as a dispatched instruction. As such, the CPU 50 is able to execute other instructions while the PUSHC operation is carried out by the CSS 56. The CPU 50 can determine when a PUSHC operation is completed by checking the state of an external state signal (ESS) as previously described. For example, an appropriate ESS can be set while a cell scheduling operation is in progress. At the completion of a scheduling operation, the CPU 50 can read the resulting scheduled address from an internal scheduled address register. The scheduled address may differ from the target address if the target address was found to be previously reserved.

The CPU 50 also services the VCs that have reserved the various cell time slots. The CPU 50 determines which VC has reserved a time slot by examining the corresponding entry in the connection ID table 110. The CPU 50 reads the connection ID table entry by executing a POPC instruction issued by a given user program. Execution of the POPC instruction causes the CSS 56 to return the addressed connection ID table entry, to copy the value of the primary scoreboard bit corresponding to the entry into an assigned cell flag register (ACFR) in the CPU 50, and to then clear the primary scoreboard bit.

The CPU 50 maintains a pointer into the connection ID table 110 that represents the current cell time slot. The CPU 50 may increment this pointer each time that a POPC instruction is executed. Because the primary scoreboard and connection ID table represent periodic containers, the CPU 50 is responsible for manipulating its connection ID table pointer modulo the container size.

The POPC instruction may also be implemented as a dispatched instruction. As such, the CPU 50 is able to execute other instructions while the POPC operation is carried out by the CSS 56. The CPU 50 can determine when a POPC operation is completed by checking the state of an appropriate ESS or by accessing an internal connection ID destination register. A suitable mechanism may be provided to guarantee that the CPU 50 will wait for completion of the POPC operation if it attempts to access the connection ID destination register before it has been written by the CSS 56.

The CSS 56 as described above may be implemented as a self-pacing system in which no external clock is required. Back pressure from the PHY layer transmission link through the UTOPIA port 64 may be used to limit the rate at which the CPU 50 can queue cells for transmission. To preserve the beneficial effect of back pressure, unassigned (IDLE) cells are queued for transmission when unassigned time slots are removed from the connection ID table by a POPC instruction. The CPU 50 may determine if a time slot is assigned or unassigned by testing the state of the ACFR. If the ACFR is zero, the time slot is unassigned and an IDLE cell is queued in order to maintain the necessary back pressure. The queuing of IDLE cells guarantees that inter-cell emission intervals (ICIs) on the transmission link are substantially equivalent to the intervals programmed into the schedule.

4. Scheduling Instructions 4.1 PUSHC Instruction

Figure 5:
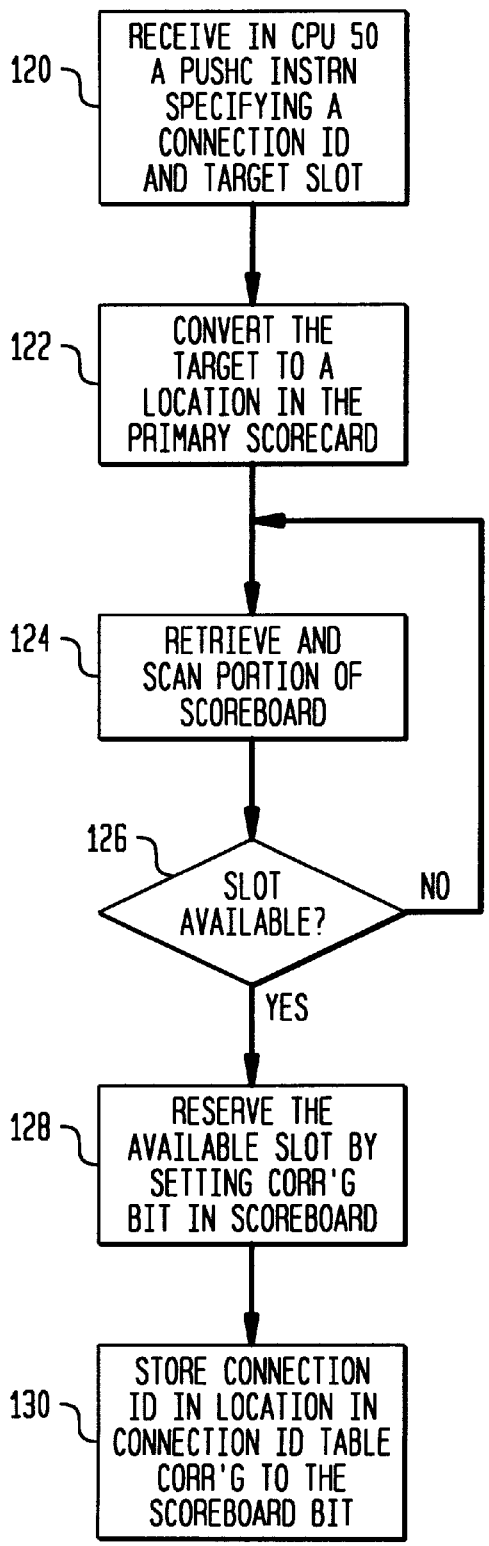
FIG. 5 is a flow diagram illustrating the operation of an exemplary cell scheduling operation in accordance with the invention.

FIG. 5 is a flow chart illustrating the operation of the cell scheduling instruction PUSHC in greater detail. In a typical application, the CPU 50 schedules a VC when adding a new connection or when servicing an existing VC. For VCs with dynamically allocated time slots, such as variable bit rate (VBR) and available bit rate (ABR) VCs, the schedule may include one or more time slot requests for each VC. The schedule may also include single or multiple scheduled time slots for constant bit rate (CBR) VCs utilizing permanent reservation of bandwidth.

The CPU 50 determines a target cell slot time by executing a generic cell rate algorithm (GCRA) which uses two real-valued parameters Increment (I) and Limit (L) and a set of intermediate variables. The algorithm is referred to as GCRA(I,L) and is described in greater detail in the above-cited reference by M. de Prycker. The parameter I in this embodiment is an inter-cell emission interval (ICI) for the corresponding VC, and the parameter L represents a tolerance value. An ICI represents the minimum spacing between successive cells of a given VC on the transmission link. For CBR and VBR connections, the ICI is generally not time varying and is typically on the order of 1/PCR where PCR refers to the peak cell rate for a given VC. For ABR connections, the ICI will typically vary based on feedback from the network, and is on the order of 1/ACR where ACR refers to the available cell rate for a given VC. The CPU 50 calculates ICIs for ABR connections in accordance with the ATM Forum RATE Based ABR service specification, which is incorporated by reference herein. The information utilized to calculate the ICIs can be stored in the control memory 22, and the resulting ICIs may be stored in control memory 22 as fractional integers in order to support high connection rates. For example, a given connection transmission rate may resolve down to 5 cells every 16 cell times. In such a case, the ICI may be stored as a fractional integer with a remainder, and the cells may be scheduled using only the integer portion of the GCRA result. The remainder is saved and added into the GCRA at the next scheduling event.

The CPU 50 can limit bandwidth loss attributable to cell scheduling collisions by scheduling connections at the calculated theoretical arrival time (TAT) less the limit L. A copy of the scheduled time is generally stored in the channel descriptor for each VC scheduled in this manner to allow for proper operation of the above-noted GCRA function. The GCRA function generates a target cell time slot for the corresponding VC.

As shown in step 120 of FIG. 5, a PUSHC instruction is issued by a user and received in CPU 50. The PUSHC instruction generally specifies a unique 16-bit connection ID which identifies the VC requesting a cell time slot. A target address in the connection ID table may be computed by CPU 50 as described above or supplied with the PUSHC instruction. The CPU 50 supplies the connection ID and the target address to the CSS 56. The CSS 56 responds to the PUSHC instruction by converting the connection ID table target address into a corresponding target location in the primary scoreboard, as shown in step 122. The CSS 56 then retrieves and begins to search through a portion of the primary scoreboard looking for the first available cell time slot at or after the target location corresponding to the target cell time slot, as shown in step 124. As noted above, the CSS 56 may continue the search from the beginning of the primary scoreboard if an available location is not found between the target location and the end of the primary scoreboard. In step 126, a decision is made as to whether or not a slot is available in the retrieved portion of the primary scoreboard. If no cell is available, another portion of the primary scoreboard may be retrieved and searched by repeating step 124 as shown. Once an available cell time slot is found, the CSS 56 reserves the slot as scheduled for the given VC by setting the corresponding scoreboard bit to a logic '1', as shown in step 128. The 16-bit connection ID specified in the PUSHC instruction is then written in step 130 into the location in the connection ID table that corresponds to the scheduled primary scoreboard bit. The steps 120–130 are repeated for each PUSHC instruction received in the ATM cell processor 12.

During the execution of a PUSHC instruction, if all bits in the primary scoreboard are set to one, indicating that there are no available cell time slots, the CSS 56 may return an error by setting a bit in the above-described CSS configuration register. Frequent checking for such an error bit can significantly slow down the effective operating rate of the cell processor. This potential problem may be addressed by taking steps to guarantee that a time slot is available in the primary scoreboard. For example, the CSS 56 could be directed to always release the present cell slot in the primary scoreboard before executing the next PUSHC instruction to thereby insure that at least that time slot will be available to service the next request. Alternatively, the CSS 56 could be configured to add new connections or activate inactive connections only when unassigned slots are encountered, such that a new connection will not be permitted if it will exceed the capacity of the primary scoreboard. In general, each connection consumes one bit position in the primary scoreboard. Control software could be provided with an accurate count of the number of active VCs on the primary scoreboard, and configured to refuse the establishment of a new connection if it will exceed the scoreboard capacity. It should be noted that a given connection may consume more than one slot in the primary scoreboard, as in the case of pre-allocated CBR connections, and in this event the available slot determination will be adjusted accordingly.

An exemplary PUSHC instruction may be in the following format:

PUSHC rsa @rsb in which rsa and rsb are registers in the CPU 50. The register rsa contains the 16-bit connection ID for the requested connection, and the register rsb contains the target cell time slot in the form of an address in the connection ID table. The base address of the connection ID table may be read from the CSS configuration register. The CSS 56 calculates the corresponding primary scoreboard bit location using the connection ID table address from register rsb and the base address read from the CSS configuration register. The CSS 56 will then search the primary scoreboard looking for an available cell time slot at or after the specified address. The 16-bit connection ID from register rsa is written by the CSS 56 into the first available location in the connection ID table at or after the location specified by the target address contained in rsb. The scoreboard search determines the first available scoreboard bit location and thereby the first available slot in the connection ID table.

4.2 PUSHF Instruction

A possible alternative implementation of the above-described PUSHC instruction is a PUSHC, Fast Mode (PUSHF) instruction. The PUSHF instruction will cause the CPU 50 and CSS 56 to perform the functions described above for locating and reserving a primary scoreboard bit for a given VC. However, the PUSHF instruction differs from the above-described PUSHC instruction in that the PUSHF instruction will not update the connection ID table. The PUSHF instruction is therefore useful in, for example, re-reserving a staticly scheduled CBR connection because the connection ID at the current location is generally known at the time that the PUSHF instruction is executed.

5. Servicing Instructions 5.1 POPC Instruction

Figure 6:
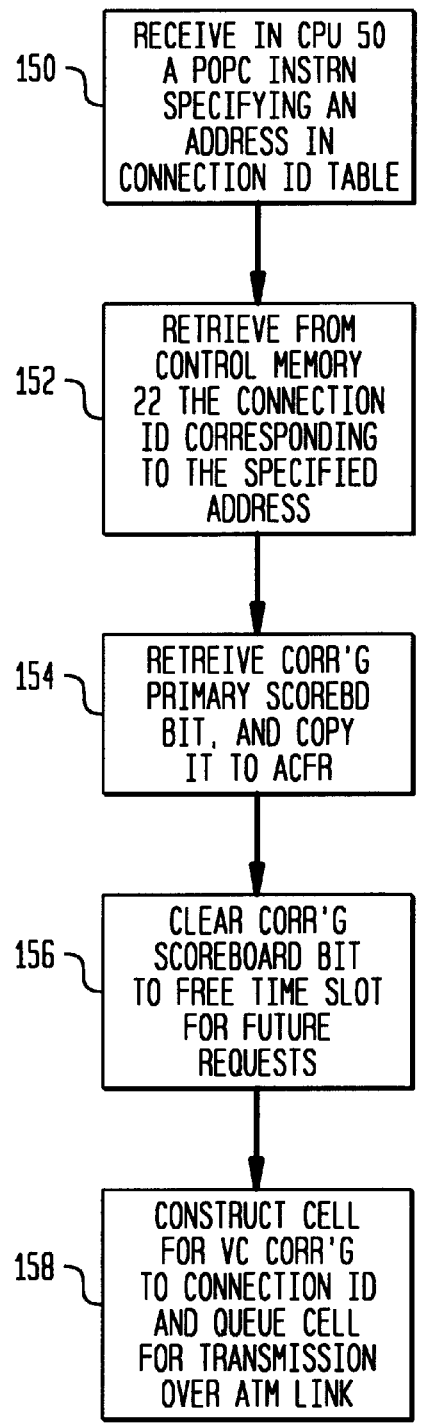
FIG. 6 is a flow diagram illustrating the operation of an exemplary cell servicing operation in accordance with the invention.

FIG. 6 is a flow diagram illustrating the operation of the cell servicing instruction POPC in greater detail. Since each location in the connection ID table represents a cell slot on a ATM transmission link, the CPU 50 can read connection IDs from the table sequentially. The CPU 50 also services the connections identified by the connection IDs. Connection servicing may involve, for example, building a cell and queuing it for transmission in a conventional ATM segmentation and reassembly (SAR) operation or reading an existing cell from memory and queuing it for transmission. Back pressure from the UTOPIA port 64 transmitter queue provides a throttling mechanism to pace the rate at which the processor proceeds through the connection ID table 110. To maintain the effectiveness of the back pressure-based rate control, the CPU 50 queues unassigned or IDLE cells in the UTOPIA port transmitter queue when unassigned locations are removed from the connection ID table.

In step 150 of FIG. 6, a POPC instruction from a given user program is received in CPU 50. The POPC instruction specifies an address in the connection ID table which identifies a connection ID for the VC and a corresponding primary scoreboard bit. In step 152, the CSS 56 retrieves from control memory 22 the connection ID stored in the specified location in the connection ID table. In step 154, the CSS 56 retrieves the primary scoreboard bit associated with the specified connection ID table entry, and copies it into the ACFR. The output of the ACFR may be connected to a designated ESS which CPU 50 can check once the POPC instruction completes to determine if the specified location was scheduled (ACFR='1') or unassigned (ACFR='0'). In step 156, the CSS 56 clears the corresponding primary scoreboard bit to mark the cell time slot as available for future scheduling requests. In step 158, the CPU 50 constructs a cell for the VC specified in the connection ID table, and queues the constructed cell for transmission over the ATM transmission link. Alternatively, the CPU 50 can retrieve a previously constructed cell and queue it for transmission. The steps 150–158 are repeated for each POPC instruction received in the CPU 50.

An exemplary POPC instruction may be in the following format:

POPC rd @rsb in which rd and rsb are registers in the CPU 50. The register rsb contains the address of the connection ID table entry of interest. Again, the base address of the connection ID table may be read from the CSS configuration register. The CSS 56 will read the addressed connection ID and write it into the register rd of CPU 50. The CSS 56 calculates the corresponding primary scoreboard address from the connection ID table address and the base address read from the CSS configuration register, reads the scoreboard bit associated with the connection ID table entry, copies its value into the ACFR, and then clears the scoreboard bit.

It should be noted that the CPU 50 may also read and write primary scoreboard and connection ID table entries utilizing instructions other than the exemplary POPC instruction described above.

5.2 POPF Instruction

A possible alternative implementation of the above-described POPC instruction is a POPC, Fast Mode (POPF) instruction. The POPF instruction will cause the CPU 50 and CSS 56 to perform the functions described above for returning and clearing a primary scoreboard bit for a given VC. However, the POPF instruction differs from the above-described POPC instruction in that the POPF instruction does not return the connection ID. The POPF instruction is therefore useful in, for example, allowing the CPU 50 to check a group of scoreboard bits quickly. If a given scoreboard bit in the group is set, the CPU can then proceed to read the corresponding entry in the connection ID table.

6. Additional Details of the Cell Scheduling Process 6.1 Bounded Primary Scoreboard Search Times The CSS 56 may utilize a primary scoreboard search technique in accordance with the invention that guarantees that an available cell time slot can be identified from any starting location within the primary scoreboard within a predetermined number of memory read cycles. An exemplary search technique which uses a secondary scoreboard to provide this desirable property will be described in greater detail below.

6.2 CSS Instruction Buffer

The CSS 56 may be configured to include a PUSHC/POPC instruction buffer. If this instruction buffer is selected as a two instruction buffer, the CPU 50 may issue up to two cell scheduling or servicing instructions without entering a stall condition. Execution of a cell scheduling or servicing instruction while the PUSHC/POPC instruction buffer is full may result in a processor stall condition until the operations specified by the first instruction are completed.

6.3 Addressing the Primary Scoreboard and Connection ID Table

Addressing of the connection ID table and primary scoreboard may be provided in the following manner. As noted above, bits 15–18 of the connection ID table address, representing the base address of the table in control memory 22, may be specified in the CSS configuration register. Bits 1–14 of the connection ID table address may be provided by software as bits 0–13 of the rsb register as specified by the above-described PUSHC and POPC instructions. For an exemplary primary scoreboard with 1024 lines and therefore 16384 entries, the scoreboard address corresponding to the specified connection ID table entry may be generated as follows:

| | |
|---|---|
| Scoreboard Address Bits(18:11) | Read from CSS configuration register; base address |
| Scoreboard Address Bits(10:1) | Read from rsb(13:4); connection ID table ADR(13:4) |
| Scoreboard Address Bit(0) | Fixed as 0xb |
| Target Bit Address | Read from rsb(3:0); connection ID table ADR(3:0) |

6.4 Initializing the Primary Scoreboard

The CPU 50 may be responsible for initializing the primary scoreboard matrix during a system initialization routine. The CPU 50 can initialize the primary scoreboard by writing all zeros into the locations in control memory 22 that comprise the primary scoreboard. Once the primary scoreboard has been initialized, the CPU 50 is free to execute cell scheduling instructions. From this point on, all schedule modifications should be performed through PUSHC and POPC instructions to insure that the internal mechanisms of the cell processor 12 remain coherent with respect to a given schedule. The CPU 50 may, however, read primary scoreboard or connection ID table entries at any time utilizing other suitable instructions without affecting the internal mechanisms.

6.5 Selecting a Primary Scoreboard Size

The desired size of the primary scoreboard, rounded up to the nearest power of two, may be specified in the CSS configuration register. Primary scoreboard sizes other than powers of two can be supported by having the CPU 50 mark certain scoreboard locations as unavailable. For example, if the desired schedule size is 2304 bits, the user could select a 4096 bit schedule and mark bits 2304 to 4095 as unavailable by executing a series of PUSHC operations to these locations. From that point on, the CSS 56 will not attempt to reserve those locations in response to cell scheduling requests issued by the CPU 50. However, a user traversing the primary scoreboard using POPC instructions should be careful to return to the beginning of the scoreboard upon reaching location 2303. In other words, once the unwanted locations have been reserved, they should not be specified as the target address of a POPC instruction. In addition, the CPU 50 should calculate PUSHC target addresses modulo 2304 instead of modulo 4096.

6.6 Use of Multiple Schedules

The ATM cell processor 12 may be configured to support multiple cell processing schedules using multiple scoreboards and connection ID tables. For example, in a given embodiment the system 10 may be configured to include sufficient control memory 22 to support up to eight 2K connection ID tables, four 4K connection ID tables, two 8K connection ID tables or one 16K connection ID table. As noted above, bits in the CSS configuration register may be used to select the scoreboard size. If eight schedules are used, PUSHC and POPC rsb address bits 12–14 can be used to choose a schedule within the block of eight. If four schedules are used, rsb address bits 13–14 can be used to select a schedule within the block of four. Other numbers of multiple schedules can be configured and selected in a similar manner.

7. Example of CSS Operation

Figure 7:
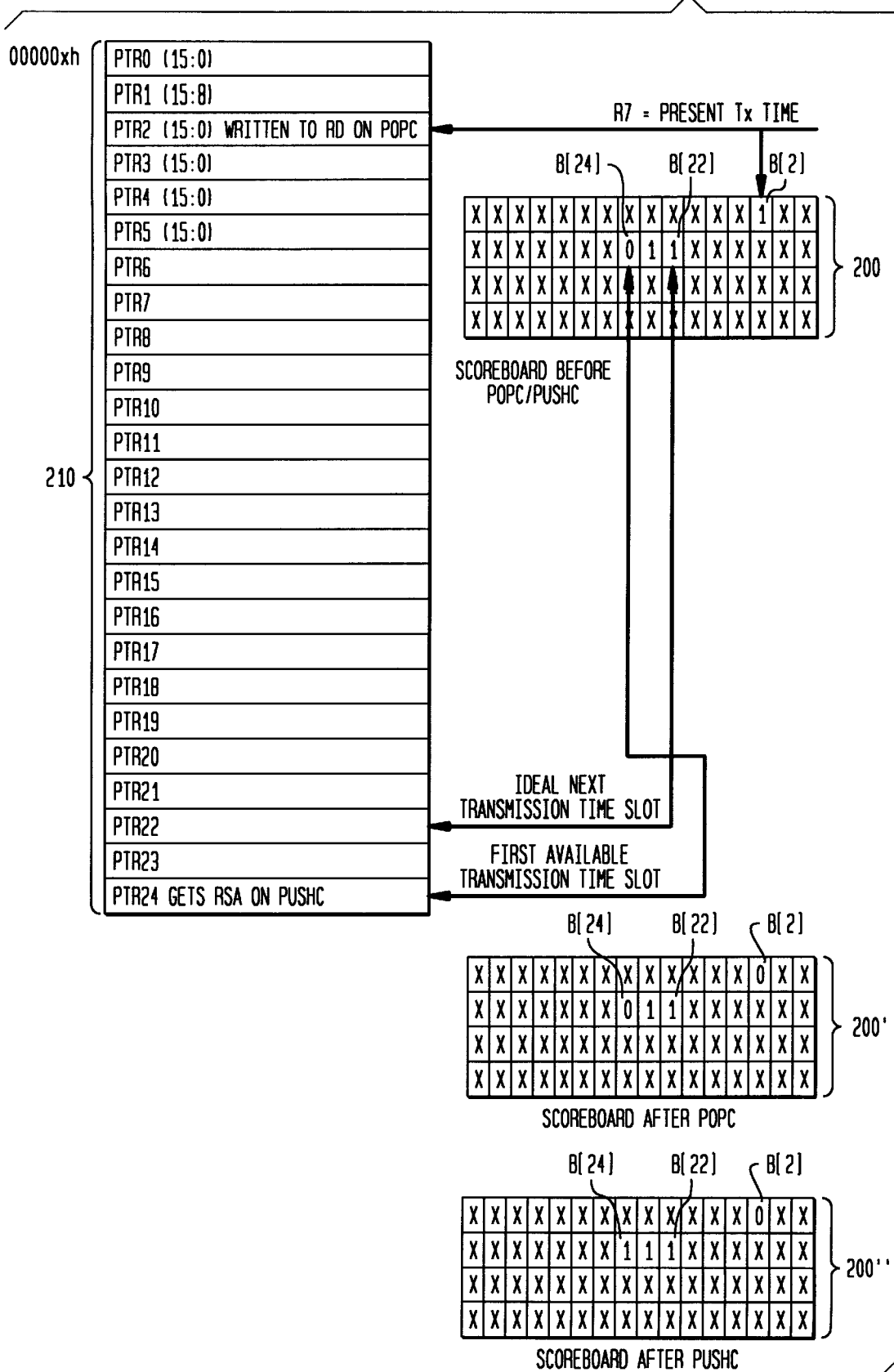
FIG. 7 illustrates an example of a cell scheduling and servicing operation in accordance with the invention.

FIG. 7 illustrates an operating example of cell scheduling and servicing in accordance with the present invention. A connection ID table 210 is maintained in the control memory 22 or at another suitable location in the ATM cell processor 12 or system 10. The connection ID table 210 in this embodiment is shown as including entries in the form of a number of pointers PTRi, i=1, 2, . . . N. Each pointer corresponds to a bit location B[i] in a primary scoreboard 200. The CPU 50 maintains, in an exemplary register designated R7, a value indicative of a halfword address identifying a target location in the connection ID table 210 and thus the target time slot for the present transmission time. In this example, register R7 contains the byte address 04, which corresponds to halfword address 02 and thus identifies the third location in the connection ID table 210. The third location in the table 210 refers to the third primary scoreboard bit B[2], which is the third bit from the right in the first line of the scoreboard 200. The bit B[2] is a logic '1' in scoreboard 200. Assuming the transmit queue of the UTOPIA port 64 is not full, the CPU 50 will read the entry PTR2 from the connection ID table 210 by executing a POPC instruction as follows:

POPC R10 @R7

The CSS 56 responds to this POPC instruction by writing the connection ID located at PTR2 into CPU register R10, copying the primary scoreboard bit B[2] associated with this connection ID table entry into the ACFR, and then clearing the scoreboard bit B[2]. Because the bit B[2] in the scoreboard 200 is a '1' at the time the POPC instruction was executed, the ACFR is set to one. The scoreboard 200' reflects the scoreboard status after execution of the above POPC instruction, and it can be seen that the bit B[2] has been cleared to zero. The CPU 50 then checks the ACFR using a conditional branch instruction to access the external state signal (ESS) line connected to the ACFR. Because the designated time slot corresponding to bit B[2] was assigned, the CPU 50 uses the connection ID returned in register R10 to address control memory 22 and to retrieve therefrom the channel descriptor for the VC that reserved the time slot. The CPU 50 then uses the information in the retrieved channel descriptor to construct a cell for that VC in SAR applications or to retrieve a previously stored cell for that VC in traffic shaping applications. In a SAR application with dynamic scheduling, the CPU 50 can determine when the connection should next be serviced by executing the above-noted GCRA (I,L) algorithm using parameters stored in the channel descriptor. The channel descriptor typically contains the target schedule time, the ICI, the limit and a fractional remainder if the ICI is a fractional integer. From this information the CPU 50 determines the next location within the connection ID table that should be scheduled for the given VC, and places the result into an exemplary register such as register R22.

The CPU 50 then schedules the connection as active by executing the following PUSHC instruction:

PUSHC R10 @R19

In response to this instruction, the CSS 56 searches the scoreboard 200' beginning at the scoreboard bit B[22] which corresponds to the connection ID table address indicated by register R19. In this example, the CSS finds that the target location has already been reserved by a previous connection, as indicated by the fact that bit B[22] is set to '1' in scoreboard 200'. The CSS therefore continues to search the scoreboard 200' until it finds an available location. An available location is found two cell slots away from the B[22] target location, as indicated by the fact that the scoreboard bit B[24] is set to a logic '0'. The CSS 56 then reserves the location for the present connection by setting the bit B[24] to '1' and by writing the connection ID provided by the CPU 50 in register R10 into the connection ID table 210 at the location designated PTR24. The scoreboard 200" shows the scoreboard status after execution of the above PUSHC instruction. The CPU 50 completes the connection servicing and rescheduling process by incrementing the service address contained in register R7, modulo the scoreboard size, which in this example is 4096, in order to proceed on to the next transmission time slot.

8. Bounded Primary Scoreboard Searching Using a Secondary Scoreboard

The CSS 56 may be provided with the ability to locate a single available cell time slot from any starting location on the primary scoreboard within a suitably bounded period of time. For example, the entire primary scoreboard in an embodiment with 16384 cell time slots can be searched from any starting location on the scoreboard within about eight 32-bit control memory read cycles. The present invention provides this bounded search time feature by generating and maintaining a second bit matrix referred to herein as a secondary scoreboard. The secondary scoreboard is generally smaller than the above-described primary scoreboard and therefore is usually maintained in a memory location internal to the cell processor 12 rather than in the external control memory 22. The secondary scoreboard provides the CSS 56 with information concerning the overall density of the primary scoreboard. More particularly, the secondary scoreboard contains information which the CSS 56 uses to direct the primary scoreboard search to a region of the primary scoreboard that is known to include a bit corresponding to an available time slot. The primary scoreboard search therefore need not proceed linearly. Instead, the search is first directed to a region identified by the secondary scoreboard information, and then proceeds linearly through the identified region until an available time slot is located. If the size of the designated regions are made sufficiently small, the linear search of such regions can be performed quickly, resulting in a tightly bounded search time. The secondary scoreboard is stored in a suitable memory location in cell processor 12 as a matrix, array or other set of memory locations suitable for storing a group of bits or other information elements. As was noted above, the primary scoreboard and/or connection ID table may also be stored in memory locations internal to the cell processor 12.

A given secondary scoreboard bit may be configured to represent the aggregate state of eight 16-bit lines in the primary scoreboard, or 128 primary scoreboard bits. A secondary scoreboard bit at a logic '0' level indicates to the CSS 56 that at least one bit of the 128 primary scoreboard bits represents an available time slot. A secondary scoreboard bit at a logic '1' level indicates to the CSS 56 that all 128 primary scoreboard bits represent unavailable time slots, such that there is no need to search that region of the primary scoreboard. Of course, numerous alternative secondary scoreboard configurations are possible.

The exemplary secondary scoreboard described above represents in part a tradeoff between die size and scheduling time. As noted, each secondary scoreboard bit represents the state of 128 primary scoreboard bits. The secondary scoreboard can therefore direct CSS to avoid a particular region of the primary scoreboard if that region is unavailable. If there is an available time slot in a given region, however, the secondary scoreboard is unable to indicate to the CSS which of the eight 16-bit lines contains the bit corresponding to the available slot. The CSS therefore may have to read all eight lines to find the available bit. But by directing the primary scoreboard search to eight 16-bit lines out of as many as 1024 or more 16-bit lines, the secondary scoreboard has bounded the search time in this example to essentially four 32-bit read cycles. The CSS 56 will therefore not be required to scan through a large number of lines as it searches for an available cell time slot. The information carried by the secondary scoreboard could be increased to further reduce cell scheduling time, but at the cost of additional memory and therefore increased die size. Alternatively, the secondary scoreboard could be maintained in an external memory, although the additional memory read cycles required to access the secondary scoreboard would impact processing speed.

In the above example, the secondary scoreboard uses a single bit to represent the status of 128 primary scoreboard bits. When used to represent a primary scoreboard which can be programmed to any size up to 1024 lines or 16384 bits, the size of the secondary scoreboard should be 16384/128 or 256 bits. The search time could be further reduced by making the secondary scoreboard larger. For example, the number of bits could be increased to 512 to thereby allow each secondary scoreboard bit to represent the aggregate state of two primary scoreboard lines. This would reduce the primary scoreboard search by two read cycles but at the cost of additional internal memory space and thus die area.

The secondary scoreboard in this exemplary embodiment should monitor every PUSHC and POPC operation performed on the primary scoreboard. Furthermore, every PUSHC operation performed on the primary scoreboard in this embodiment should retrieve all eight 16-bit lines of the 128 bit block so that the secondary scoreboard can monitor the availability of the block. When a user issues a PUSHC instruction, the user provides an address to the CSS 56 that represents the first bit position within the primary scoreboard that can be used for scheduling a cell. The CSS 56 is then responsible for finding the first location at or after this time and marking it as reserved. The CSS 56 begins its search with the first line of the 128-bit block regardless of whether the offset of the first available bit is deeper into the block. This is because if an available bit is found and set, the CSS 56 needs to determine if it was the last bit of the 128-bit block, which it cannot do without having seen all 128 bits. The CSS 56 therefore reads all eight 16-bit lines regardless of the starting offset. If the CSS 56 sees that an available bit is found and set, and that this bit is the last bit in the 128-bit block, it sets the corresponding bit in the secondary scoreboard. The 128-bit block is thus marked as totally unavailable so that future scheduling requests can be directed around this and other unavailable blocks. The CSS 56 clears the secondary scoreboard bit as soon as it receives a POPC instruction that addresses a location within the corresponding 128-bit block. This is because the POPC instruction clears the target bit in the primary scoreboard, such that an available location is guaranteed in the corresponding block.

Figure 8:
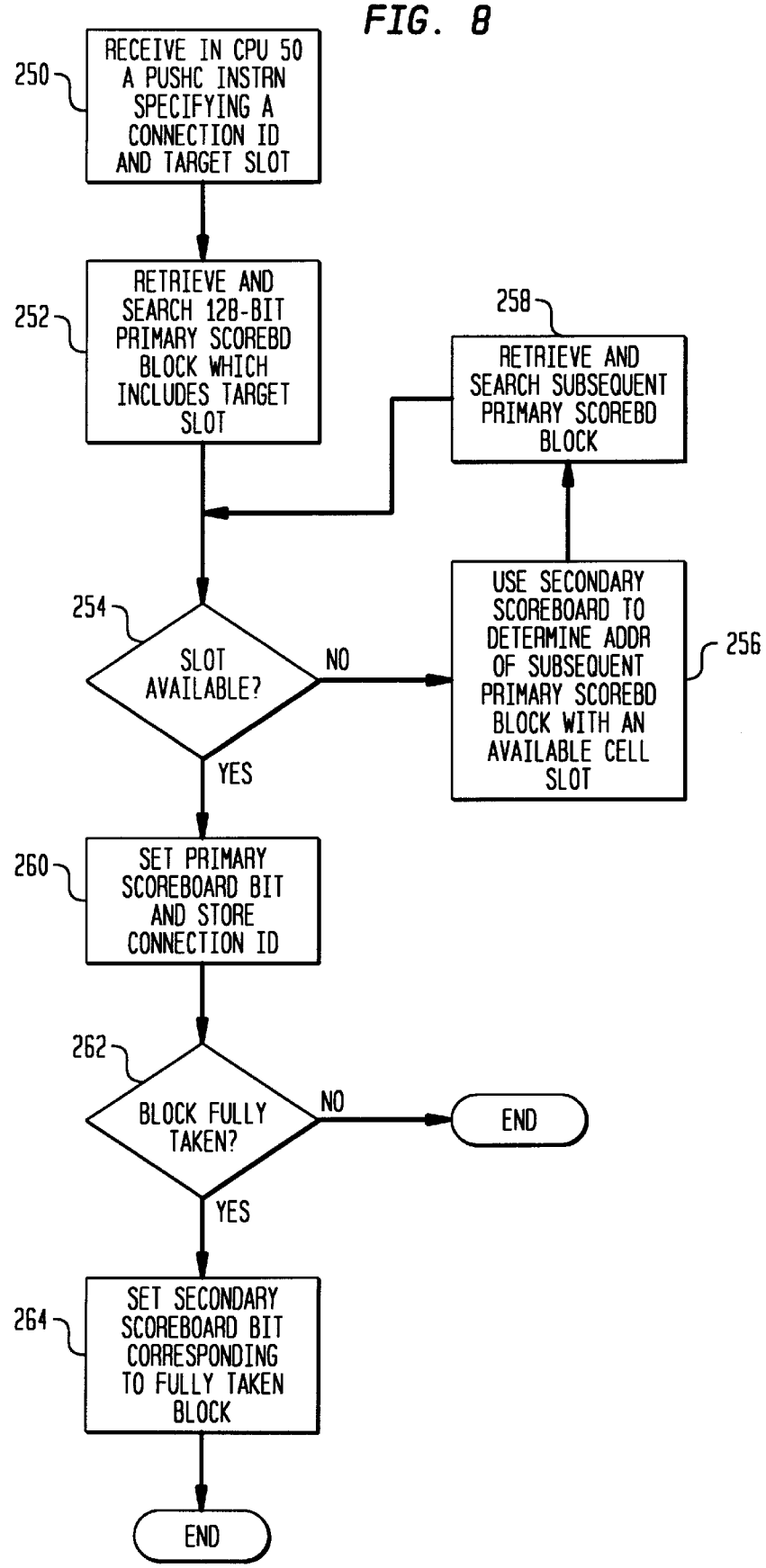
FIG. 8 is a flow diagram illustrating bounded searching using a secondary scoreboard in accordance with the invention.

FIG. 8 is a flow diagram illustrating an exemplary search process utilizing a secondary scoreboard. A PUSHC instruction is received in step 250 and as noted above typically specifies a connection ID and a target cell time slot. The primary scoreboard search process begins in step 252 when a 128-bit block of primary scoreboard bits, including the bit corresponding to the target location, is retrieved and searched. A primary scoreboard controller in the CSS 56 may perform the searching by scanning all eight 16-bit words of the retrieved 128-bit primary scoreboard block for an available cell time slot at or after the target location. A secondary scoreboard controller in the CSS 56 knows whether a location is available in the 128-bit block but does not know if it is at or after the target time. The primary scoreboard controller therefore searches all eight 16-bit lines of the primary scoreboard, beginning with the first word of the block. It ignores available bits until it reaches the bit position corresponding to the target location but it notes the ones density up to the target location in case the target bit proves to be the last available bit in the block. Step 254 is a decision operation which determines whether an available slot has been located in the primary scoreboard block being searched. If no available cell time slot is found in the retrieved primary scoreboard block, step 256 indicates that the secondary scoreboard is used to determine an address of a subsequent primary scoreboard block which is known to include an available time slot. This subsequent primary scoreboard block is then retrieved and searched as shown in step 258. If the first or subsequent primary scoreboard blocks are found to include a bit indicating an available cell time slot, the corresponding primary scoreboard bit is set to reserve the slot and the connection ID for the VC is stored in the appropriate location in the connection ID table, as shown in step 260. A determination is then made in step 262 as to whether there are any other available cell time slots indicated in the block. If the cell time slots corresponding to the bits in the primary scoreboard block are not fully taken, the process ends without altering the secondary scoreboard bits. If the cell time slots are fully taken as a result of the current scheduling request, the secondary scoreboard controller in step 264 sets the secondary scoreboard bit corresponding to the now fully reserved block of the primary scoreboard. Assuming there were no unavailable bits found prior to the target bit, the primary scoreboard controller therefore must finish reading all eight 16-bit lines of a given primary scoreboard block so that if it does not find a second available bit, it can tell the secondary scoreboard controller that the 128-bit block is now fully taken.

If the primary scoreboard controller finds that no bit is available in the first primary scoreboard block, it will continue to search for an available bit in a subsequent block, as indicated in steps 256 and 258 of FIG. 8. The secondary scoreboard is then used to prevent the primary scoreboard controller from searching any subsequent blocks which are completely unavailable. While the primary scoreboard controller is conducting a first search of the primary scoreboard, the secondary scoreboard controller scans through the secondary scoreboard. If the primary scoreboard search fails to find an available bit, the secondary scoreboard controller is waiting with the address of a subsequent block in the primary scoreboard that is not full. Because the subsequent block falls after the target location, and because the secondary scoreboard has indicated that a bit is available in that block, the next search by the primary scoreboard controller is guaranteed to find an available bit. The use of the secondary scoreboard has thus bounded the search time to eight 32-bit primary scoreboard read cycles, that is 2×4 32-bit words or 2×8 16-bit words. It should be apparent that if a search of a second primary scoreboard block is required, this search should be capable of reading all eight 16-bit lines in the 128-bit block in case the second block has only one remaining available bit. If the last remaining available bit in the subsequent block is scheduled as a result of the search, the primary scoreboard controller should instruct the secondary scoreboard controller to set the corresponding bit in the secondary scoreboard. It should be noted that when a VC is rescheduled, the present time slot is generally available because it was just cleared in response to the POPC servicing instruction. The rescheduling PUSHC instruction will therefore experience a worst case maximum search time if the present time slot is the only available slot on the scoreboard. The present time slot will generally not be serviced again until a number of POPC instructions equivalent to the scoreboard size in bits are executed.

9. Pre-Reservation of Bandwidth For CBR Connections

The ATM cell processor 12 is highly flexible in that it allows a user to implement many different scheduling methodologies through a combination of algorithmic functions carried out by CPU 50 and hardware-assisted functions carried out by CSS 56. For example, the ATM cell processor 12 can support pre-reservation of bandwidth for connections that require constant bit rates (CBRs) while also allowing connections that require a variable bit rate (VBR) to be scheduled in cell time slots not pre-reserved for the CBR connections. The cell processor 12 permits a given user to pre-reserve as many locations in the primary scoreboard as desired. The user can do this in several different ways. At an initialization of the cell processor 12, the user can reserve the target locations by issuing a series of PUSHC instructions. After requesting service of a pre-reserved location using a POPC instruction, the user immediately reschedules the connection specifying this same location. This reschedules the location for the same VC and in effect overcomes the clearing action of the POPC instruction. The user is also able to determine whether a connection is to be semi-permanently reserved. A firmware function could be implemented in which a given connection is marked as a CBR connection and the corresponding location is immediately re-reserved after a POPC instruction by issuance of an appropriate PUSHC instruction.

10. Tunneling

The ATM cell processor 12 is able to support tunneling applications. In an exemplary tunneling application, a user could issue a request to establish a CBR virtual path (VP) connection and then tunnel a series of virtual channel connections on top of it. The user could utilize the above-described pre-reservation of bandwidth mechanism to reserve a number of entries in the cell schedule represented by the primary scoreboard. The user reserves enough entries to guarantee that the connection has the desired amount of bandwidth. In effect, the user is reserving bandwidth for the VP-based tunnel. The user then configures a series of virtual channel connections that will travel over the VP. To do this, the user divides the bandwidth of the VP up among the virtual channel connections that are carried over it. This process may be complicated by the fact that the virtual channel connections may be available bit rate (ABR) connections in which the bit rates can change over time.

FIG. 9 illustrates an exemplary technique for managing tunneling operations in accordance with the present invention. The ATM cell processor 12 manages tunneling operations using two different types of primary scoreboards. The first type of primary scoreboard used in this example is referred to as a master scoreboard and is shown in FIG. 9 as scoreboard 300. The second type of primary scoreboard is referred to as a tunnel control scoreboard, three of which are shown in FIG. 9 as scoreboards 310, 320 and 330. The four scoreboards 300, 310, 320 and 330 may each be configured in control memory 22 in a manner similar to the primary scoreboards previously described. The master scoreboard 300 is used to manage cell scheduling for the actual transmission link. The master scoreboard 300 has a number of cell time slots permanently reserved for three VP tunnels designated VP1, VP2 and VP3, with the remainder of the slots available for the non-tunneled connections to access in the manner described above.

When a given user pre-reserves locations in the master scoreboard 300 for tunnels VP1, VP2 or VP3, the corresponding tunnel control boards 310, 320 and 330 are set up by the user in control memory 22. Each tunnel control board is used for scheduling connections that will use the corresponding tunnel. The tunnel control board is generally the same size as the master scoreboard. The user marks as unavailable all locations in the tunnel control board that do not correspond to the locations selected for the corresponding tunnel in the master scoreboard. The user may perform this marking operation by issuing a series of PUSHC instructions to each location in a given tunnel control board that does not correspond to a location reserved for that tunnel in the master scoreboard. After completing the series of PUSHC instructions, the user can begin scheduling operations. The user schedules tunneled connections for a given tunnel on the corresponding tunnel control board such that the schedule requests are directed to the appropriate reserved bit locations.

The schedule requests may then be serviced in the following manner. The user issues a POPC instruction in the manner previously described. When a POPC instruction refers to a location in the master scoreboard which is reserved for a tunnel, the corresponding location in the tunnel control board is automatically checked to determine if a schedule request has been entered for that location. If the request has been entered, the CSS 56 services it and then reschedules the connection by issuing a PUSHC instruction to a target location in the tunnel control board. This target location may be determined using the GCRA in the manner previously described. The user then re-reserves that location in the master scoreboard. By using both a master scoreboard and a tunnel control board, the user is able to reserve a CBR cell stream on the transmission link for the VP by using the master scoreboard while at the same time scheduling VBR or ABR connections for individual VCs using the tunnel control boards.

11. Fully Independent Rates

The ATM cell processor 12 of the present invention allows for full rate independence among different VCs. This is in contrast to prior art cell processors which typically rely on the time out of counters to create service intervals, and are therefore limited in the number of different rates that can be supported. In the cell processor 12, each VC may have a unique rate that is handled independently from the rates of other VCs. The rate is provided to the CSS 56 in the form of an inter-cell emission interval (ICI), which the CPU 50 and the CSS 56 can use to determine a target schedule time for the VC in the manner previously described. If the rate of a given connection is changed based on feedback from the ATM network, as will often be the case with ABR VCs, the CSS 56 need not alter the scheduling mechanism. Instead, the CSS 56 simply recalculates the rate and corresponding interval and provides the recalculated interval at the next scheduling request.

12. Inherently Fair Bandwidth Allocation

The cell processor 12 implements inherently fair cell scheduling in that it can, for example, be configured to require only a single scheduled request to exist on the primary scoreboard for a given VC at any one time. If other connections become active, they can immediately be provided equal access to the available link bandwidth. This represents a considerable improvement over prior art cell scheduling systems that may require multiple scheduled requests for a single VC to maintain active status. The resulting schedule in such a prior art system can become congested with the traffic of an existing user, thereby making it difficult for a new user to get a fair allocation of bandwidth.

13. Multiple Layers of Scheduling Requests

An alternative embodiment of the present invention may provide multiple primary scoreboards for a single transmission link, and allow the POPC instruction to scan these multiple scoreboards. For example, high priority traffic could by scheduled on one primary scoreboard while low priority traffic is scheduled on a second primary scoreboard. This insures that low priority scheduling requests do not interfere with high priority requests. A POPC instruction could then be implemented to check the high priority scoreboard first and if a location is not found it could check the lower priority scoreboard. The ATM cell processor could maintain a "bubble" count for the lower priority scoreboard. The bubble count would be incremented each time the higher priority scoreboard was serviced and decremented each time an unassigned slot is discarded from the lower priority scoreboard. Scheduling requests for the lower priority scoreboard would be made at the target time plus the bubble count. The higher priority board would thus represent an external cell source to the lower priority scoreboard. The term "bubble count" as used herein is intended to include a count provided by any type of counter, whether implemented in software, hardware, firmware or a combination thereof, which provides the desired counting functions.

Another alternative embodiment of the invention may provide different primary scoreboards for different cell rates. Connections with high cell rates could be scheduled on one scoreboard and connections with lower rates could be scheduled on another scoreboard. This would prevent a large number of low bandwidth VCs from getting grouped together and blocking high rate connections for an extended period of time.

14. External ATM Cell Multiplexing

The cell scheduling techniques of the present invention can be utilized to accommodate an external cell source that requests access to a given ATM transmission link. This external cell source will consume a number of cell time slots and may block the CSS 56 from access to the transmission link. In such an embodiment, the CSS 56 could be responsible for intermixing cells from the external cell source with internally-generated cells. Assuming that the external cells are of a higher priority than internally-generated cells, the cell processor 12 may temporarily be unable to proceed through its schedule. When the cell processor is able to proceed through the schedule again, scheduling requests that exist further out in time will have waited longer than necessary. The cell processor could therefore be configured to skip any unscheduled locations that exist between a previous scheduled location and the present service address, and to go directly to the subsequent scheduled locations. Although this would normally result in connections scheduled further out in time being serviced too soon, the suspension of schedule servicing while high priority external cells are multiplexed into the cell stream allows the unused slots to be dropped without violating the peak cell rate of the connections following the unused slots.

As in the above-described multiple layer scheduling, the ATM cell processor may also utilize a bubble count to provide efficient utilization of bandwidth when an external cell source is present. The bubble count in such an embodiment may represent the number of cells that have been sent on the ATM transmission link that were not scheduled in the primary scoreboard. The bubble count thus also represents the number of unassigned slots that can be discarded as they are encountered on the primary scoreboard without resulting in any traffic shaping violations. All scheduling requests made should be scheduled at a time corresponding to the target time plus the bubble count. Adding the bubble count to the target time in this manner will generally not increase the service time. This is because if other requests exist at or after the target time, the request would have been pushed out anyway, and if other requests do not exist at or after the target time, the resulting idle slots will eventually be discarded. As unassigned slots are encountered on the primary scoreboard, if the bubble count is non-zero, the unassigned slot is disregarded instead of an IDLE cell being queued for transmission, and the cell processor can proceed immediately to the next location in the primary scoreboard. The bubble count is then decremented by one. If the cell processor encounters an unassigned slot in the primary scoreboard board and the bubble count is zero, the slot is not discarded and the cell processor will instead queue an IDLE cell on the transmission link.

The CPU 50 could be configured to include a pop range (POPR) instruction which specifies a target address and utilizes a range equal to the current bubble count. The POPR instruction will direct the CSS 56 to scan the primary scoreboard for a set bit between the target address and the target address plus bubble count. If no set bit is found set within the range, the CSS 56 will clear the ACFR, and the bubble count will be reset to zero. If a set bit is found within the range, the CSS 56 will set the ACFR, return the corresponding entry in the connection ID table, and the bubble count will be decremented by the number of locations between the target location and the actual location of the set bit. As noted above, this bubble count mechanism may be implemented in software using the CPU 50 of cell processor 12. Alternatively, the bubble count mechanism may be a distinct hardware and/or firmware function implemented within the CSS 56 or elsewhere in the cell processor 12.

It should be understood that the foregoing description is merely illustrative of the invention. Numerous alternative embodiments within the scope of the appended claims will be apparent to those of ordinary skill in the art.

The claimed invention is:

1. A method of allocating cells in an asynchronous transfer mode (ATM) communication system, the method comprising the steps of:

generating a first group of information elements with each element in the first group representing a cell time slot, wherein the value of a given element in the first group indicates whether or not the corresponding cell time slot is available for transmission;

generating a second group of information elements, each element in the second group of information elements corresponding to a block of information elements in the first group and indicative of whether the corresponding block of information elements includes at least one information element indicative of an available cell time slot, searching the first group of information elements, in response to a cell scheduling request of a given virtual connection in the ATM system, beginning at an element corresponding to a target time slot and proceeding through the first group of elements until an element corresponding to an available time slot is identified; and scheduling the available time slot for use by the virtual connection by altering the identified element to indicate that the available time slot has been scheduled.

2. The method of claim 1 wherein the information elements are bits, with each bit in the first group representing a cell time slot and each bit in the second group indicating whether at least one time slot is available in a block of bits in the first group.

3. A method of allocating cells in an asynchronous transfer mode (ATM) communication system, the method of comprising the steps of:

generating a first group of information elements, with each element in the first group representing a time slot, wherein the value of a given element in the first group indicates whether or not the corresponding cell time slot is available for transmission;

reserving at least one cell time slot in a transmission link for a virtual path connection;

setting an information element in the first group of information elements corresponding to the cell time slot reserved for the virtual path connection, such that said information elements indicate the reserved cell time slot is unavailable; and generating a tunnel control group of information elements, with each information element in the tunnel control group corresponding to a cell time slot in the transmission link, each of the tunnel control group information elements corresponding to a slot or slots reserved for the virtual path connection, the information elements set in a first manner indicating an available time slot, and all other tunnel control group information elements set in a second, opposite manner indicating unavailable time slots.

4. The method of claim 3 wherein the information elements are bits and further including the steps of:

receiving a servicing request corresponding to the virtual path connection;

searching the tunnel control group of bits for the virtual path connection to determine if a cell time slot has been scheduled for the corresponding location;

directing transmission of a cell in a scheduled cell time slot if the time slot has been scheduled for the corresponding location;

resetting the corresponding bit of the tunnel control group of bits to indicate that the corresponding cell time slot is again available for scheduling; and setting a bit in the first group of bits corresponding to the cell time slot reserved for the virtual path connection, such that said bit indicates the reserved cell time slot is unavailable.

5. A method of allocating cells in an asynchronous transfer mode (ATM) communication system, the method comprising the steps of:

generating a first group of bits, with each bit in the first group representing a cell time slot, wherein the value of a given bit in the first group of bits indicates whether or not the corresponding cell time slot is available for transmission;

generating a second group of bits, with each bit in the second group of bits corresponding to a block of bits in the first group of bits and indicative of whether the corresponding block of bits includes at least one bit indicative of an available cell time slot; and utilizing the second group of bits to determine a block of the first group of bits to be searched in response to a cell scheduling request of a given virtual connection in the ATM system.

6. An apparatus for use in allocating cells in an asynchronous transfer mode (ATM) communication system, the apparatus comprising:

a first group of memory locations for storing a first group of information elements with each element in the first group representing a cell time slot, wherein the value of a given element in the first group of bits indicates whether or not the corresponding cell time slot is available for transmission;

a second group of memory locations for storing a second group of information elements, each element in the second group of information elements corresponding to a block of information elements in the first group of elements and indicative of whether the corresponding block of elements includes at least one bit indicative of an available cell time slot; and a processor operative to search the first group of information elements, in response to a cell scheduling request of a given virtual connection in the ATM system, beginning at an element corresponding to a target time slot and proceeding through the first group of elements until an element corresponding to an available time slot is identified, and to schedule the available time slot for use by the virtual connection by altering the identified element to indicate that the available time slot has been scheduled.

7. The apparatus of claim 6 wherein the first group of information elements is configured as first group of bits with each bit representing a cell time slot.

8. The apparatus of claim 7 further including a memory for storing the first group of bits and a connection identifier table, wherein the connection identifier is stored in a memory location corresponding to the identified bit.

9. A method of allocating cells in an asynchronous transfer mode (ATM) communication system, the method comprising the steps of:

generating a first group of bits with each bit in the first group representing a cell time slot, wherein the value of a given bit in the first group indicates whether or not the corresponding cell time slot is available for transmission;

receiving a scheduling instruction specifying a connection identifier for a given virtual connection and an address in a connection identifier table corresponding to a target time slot;

converting the connection identifier table address into an address for a bit in the first group of bits corresponding to the target time slot;

retrieving a portion of the first group of bits, the portion of the first group of bits including the bit corresponding to the target time slot and at least one additional bit corresponding to a subsequent cell time slot;

searching the portion of the first group of bits, in response to the scheduling instruction of the given virtual connection in the ATM system, until a bit corresponding to an available time slot is identified; and scheduling the available time slot for use by the virtual connection by altering the identified element to indicate that the available time slot has been scheduled.

10. The method of claim 9 further including the step of storing the connection identifier in a connection identifier table location corresponding to the identified bit.

11. A method of allocating cells in an asynchronous transfer mode (ATM) communication system, the method comprising the steps of:

generating a first group of bits with each bit in the first group representing a cell time slot, wherein the value of a given bit in the first group indicates whether or not the corresponding cell time slot is available for transmission;

receiving a servicing instruction specifying an address in a connection identifier table;

retrieving from the connection identifier table a connection identifier corresponding to the specified address and identifying a virtual connection in the ATM system;

retrieving from a memory storing the first group of bits a bit corresponding to the specified address in the connection identifier table;

directing transmission of a cell for the virtual connection if the retrieved bit indicates that the corresponding cell time slot has been scheduled for the virtual connection; and altering the corresponding bit to indicate that the cell time slot has been serviced and is therefore again available for subsequent scheduling requests.

12. The method of claim 11 wherein the step of directing transmission of a cell for the virtual connection further includes the step of constructing a cell for the virtual connection for transmission during the scheduled cell time slot.

13. The method of claim 11 wherein the step of directing transmission of a cell for the virtual connection further includes the step of retrieving a previously constructed cell for the virtual connection for transmission during the scheduled cell time slot.

14. A method of allocating cells in an asynchronous transfer mode (ATM) communication system, the method comprising the steps of:

generating a first group of bits with each bit in the first group representing a cell time slot, wherein the value of a given bit in the first group indicates whether or not the corresponding cell time slot is available for transmission;

retrieving a first block of bits within the first group of bits in response to a scheduling instruction specifying a connection identifier of a virtual connection and a target cell slot, the first block of bits including a bit corresponding to the target cell time slot;

searching through the retrieved first block to locate a bit indicative of an available cell time slot at or after the bit corresponding to the target cell time slot;

if an available cell time slot is located, determining if there are any other bits in the first block of bits indicative of other available cell time slots;

if there are no other bits in the first block indicative of other available cell time slots, altering a bit in a second group of bits to indicate that the first block of the first group includes only bits corresponding to unavailable cell time slots, the second group of bits including a bit for each of a plurality of blocks of bits in the first group of bits, the second group of bits indicative of whether the corresponding block of first group bits includes a bit indicative of an available cell time slot.

15. The method of claim 14 further including the step of, if no available cell time slot is located in the first block of bits in the first group of bits, using the second group of bits to identify a subsequent block of bits in the first group of bits which includes a bit indicative of an available cell time slot.

16. The method of claim 15 further including the steps of:

retrieving the subsequent block of bits in the first group of bits which includes a bit indicative of an available cell time slot;

searching the subsequent block of bits to locate the bit indicative of the available cell time slot;

scheduling the available time slot for use by the virtual connection by altering the bit indicative of the available time slot to indicate that the available time slot has been scheduled;

determining if the subsequent block includes any other bits indicative of other available cell time slots; and if there are no other bits in the subsequent block indicative of other available cell time slots, altering a bit in a second group of bits to indicate that the subsequent block of the first group includes only bits corresponding to unavailable cell time slots.

17. A method of allocating cells in an asynchronous transfer mode (ATM) communication system, the method comprising the steps of:

providing multiple groups of bits, with each group of bits indicating a schedule status of a portion of traffic for a transmission link of the ATM system;

utilizing a first group of bits of the multiple groups to reflect schedule status regarding high priority traffic on the transmission link;

generating a second group of bits of the multiple groups to be indicative of the schedule status of lower priority traffic on the transmission link;

searching the first group of bits, in response to a cell scheduling request of a given virtual connection in the ATM system, beginning at a bit corresponding to a target time slot and proceeding through the first group of elements until a bit corresponding to an available time slot is identified; and scheduling the available time slot for use by the virtual connection by altering the identified bit to indicate that the available time slot has been scheduled.

18. An apparatus for use in allocating cells in an asynchronous transfer mode (ATM) communication system, the apparatus comprising:

a first group of memory locations for storing a first group of bits with each bit in the first group representing a cell time slot, wherein the value of a given bit in the first group of bits indicates whether or not the corresponding cell time slot is available for transmission;

a processor operative to receive a scheduling instruction specifying a connection identifier for a virtual connection and an address in a connection identifier table corresponding to a target time slot, to convert the connection identifier table address into an address for a bit in the first group of bits corresponding to the target time slot, and to retrieve from memory a portion of the first group of bits including the bit corresponding to the target time slot and at least one additional bit corresponding to a subsequent cell time slot;

the processor further being operative to search the first group of bits beginning at a bit corresponding to the target time slot and proceeding through the first group of bits until a bit corresponding to an available time slot is identified, and to schedule the available time slot for use by the virtual connection by altering the identified bit to indicate that the available time slot has been scheduled.

19. An apparatus for use in allocating cells in an asynchronous transfer mode (ATM) communication system, the apparatus comprising:

a first group of memory locations for storing a first group of bits with each bit in the first group representing a cell time slot, wherein the value of a given bit in the first group of bits indicates whether or not the corresponding cell time slot is available for transmission; and a processor operative to receive a servicing instruction specifying an address in a connection identifier table, to retrieve from the connection identifier table a connection identifier corresponding to the specified address and identifying a virtual connection in the ATM system, to retrieve from a memory storing the first group of bits a bit corresponding to the specified address in the connection identifier table, to direct transmission of a cell for the virtual connection if the retrieved bit indicates that the corresponding cell time slot has been scheduled for the virtual connection, and to alter the corresponding bit to indicate that the cell time slot has been serviced and is therefore again available for subsequent scheduling requests.

20. The apparatus of claim 19 wherein the processor is further operative to construct a cell for the virtual connection for transmission during the scheduled cell time slot.

21. The apparatus of claim 19 wherein the processor is further operative to retrieve a previously constructed cell for the virtual connection for transmission during the scheduled cell time slot.

22. An apparatus for use in allocating cells in an asynchronous transfer mode (ATM) communication system, the apparatus comprising:

a first group of memory locations for storing a first group of bits with each bit in the first group representing a cell time slot, wherein the value of a given bit in the first group of bits indicates whether or not the corresponding cell time slot is available for transmission; and a processor operative to retrieve a first block of bits within the first group of bits in response to a scheduling instruction specifying a connection identifier of a virtal connection and a target cell slot, the first block of bits including a bit corresponding to a target cell time slot, to search through the retrieved first block to locate a bit indicative of an available cell time slot at or after the bit corresponding to the target cell time slot, if an available cell time slot is located, to determine if there are any other bits in the first block of bits indicative of other available cell time slots, and if there are no other bits in the first block indicative of other available cell time slots, altering a bit in a second group of bits to indicate that the first block of the first group includes only bits corresponding to unavailable cell time slots, the second group of bits including a bit for each of a plurality of blocks of bits in the first group of bits, the second group of bits indicative of whether the corresponding block of first group of bits includes a bit indicative of an available cell time slot.

23. The apparatus of claim 22 wherein the processor is further operative, if no available cell time slot is located in the first block of bits in the first group of bits, to utilize the second group of bits to identify a subsequent block of bits in the first group of bits which includes a bit indicative of an available cell time slot.

24. The apparatus of claim 23 wherein the processor is further operative to retrieve the subsequent block of bits in the first group of bits which includes a bit indicative of an available cell time slot, to search the subsequent block of bits to locate the bit indicative of the available cell time slot, to schedule the available time slot for use by the virtual connection by altering the bit indicative of the available time slot to indicate that the available time slot has been scheduled, to determine if the subsequent block includes any other bits indicative of other available cell time slots, and if there are no other bits in the subsequent block indicative of other available cell time slots, to alter a bit in a second group of bits to indicate that the subsequent block of the first group includes only bits corresponding to unavailable cell time slots.

25. A method of allocating cells in an asynchronous transfer mode (ATM) communication system, the method comprising the steps of:

generating multiple groups of information elements with each group of information elements indicating a schedule status of a group of virtual connections having a given cell rate;

each element in each group representing a cell time slot, wherein the value of a given element in a group indicates whether or not the corresponding cell time slot is available for transmission;

searching a first group of information elements, in response to a cell scheduling request of a given virtual connection in the ATM system, beginning at an element corresponding to a target time slot and proceeding through the first group of elements until an element corresponding to an available time slot is identified; and scheduling the available time slot for use by the virtual connection by altering the identified element to indicate that the available time slot has been scheduled.

26. A method of allocating cells in an asynchronous transfer mode (ATM) communication system, the method comprising the steps of:

generating multiple groups of information elements with each group of information elements indicating a schedule status of a separate transmission link in a system supporting multiple transmission lines;

each element in each group representing a cell time slot, wherein the value of a given element in each group indicates whether or not the corresponding cell time slot is available for transmission;

searching a first group of information elements, in response to a cell scheduling request of a given virtual connection in the ATM system, beginning at an element corresponding to a target time slot and proceeding through the first group of elements until an element corresponding to an available time slot is identified; and scheduling the available time slot for use by the virtual connection by altering the identified element to indicate that the available time slot has been scheduled.

27. An apparatus for use in allocating cells in an asynchronous transfer mode (ATM) communication system, the apparatus comprising:

a first group of memory locations for storing a first group of information elements with each element in the first group representing a cell time slot, wherein the value of a given element in the first group of bits indicates whether or not the corresponding cell time slot is available for transmission;

a second group of memory locations for storing a tunnel control group of information elements, with each element in the tunnel control group corresponding to a cell time slot, with each of the tunnel control information group elements corresponding to a slot reserved for the virtual path connection, information elements set in a first manner indicating an available time slot, and all other tunnel control group bits set in a second manner indicating unavailable time slots; and a processor operative to search the first group of information elements, in response to a cell scheduling request of a given virtual connection in the ATM system, beginning at an element corresponding to a target time slot and proceeding through the first group of elements until an element corresponding to an available time slot is identified, and to schedule the available time slot for use by the virtual connection by altering the identified element to indicate that the available time slot has been scheduled.

28. An apparatus for use in allocating cells in an asynchronous transfer mode (ATM) communication system, the apparatus comprising:

a first group of memory locations for storing a first group of information elements with each element in the first group representing a cell time slot, wherein the value of a given element in the first group of bits indicates whether or not the corresponding cell time slot is available for transmission;

a plurality of additional groups of memory locations for storing a corresponding plurality of additional groups of information elements, with each group of elements indicating a schedule status of a portion of traffic for the transmission link of the ATM system; and a processor operative to search the first group of information elements, in response to a cell scheduling request of a given virtual connection in the ATM system, beginning at an element corresponding to a target time slot and proceeding through the first group of elements until an element corresponding to an available time slot is identified, and to schedule the available time slot for use by the virtual connection by altering the identified element to indicate that the available time slot has been scheduled.

29. An apparatus for use in allocating cells in an asynchronous transfer mode (ATM) communication system, the apparatus comprising:

a first group of memory locations for storing a first group of information elements with each element in the first group representing a cell time slot, wherein the value of a given element in the first group of bits indicates whether or not the corresponding cell time slot is available for transmission;

a plurality of additional groups of memory locations for storing a corresponding plurality of additional groups of information elements, with each group of elements indicating a schedule status of a group of virtual connections having a given cell rate; and a processor operative to search the first group of information elements, in response to a cell scheduling request of a given virtual connection in the ATM system, beginning at an element corresponding to a target time slot and proceeding through the first group of elements until an element corresponding to an available time slot is identified, and to schedule the available time slot for use by the virtual connection by altering the identified element to indicate that the available time slot has been scheduled.

30. An apparatus for use in allocating cells in an asynchronous transfer mode (ATM) communication system, the apparatus comprising:

a first group of memory locations for storing a first group of information elements with each element in the first group representing a cell time slot, wherein the value of a given element in the first group of bits indicates whether or not the corresponding cell time slot is available for transmission;

a plurality of additional groups of memory locations for storing a corresponding plurality of additional groups of information elements, with each group of elements indicating a schedule status of a separate transmission link in a system supporting multiple transmission links; and a processor operative to search the first group of information elements, in response to a cell scheduling request of a given virtual connection in the ATM system, beginning at an element corresponding to a target time slot and proceeding through the first group of elements until an element corresponding to an available time slot is identified, and to schedule the available time slot for use by the virtual connection by altering the identified element to indicate that the available time slot has been scheduled.

31. A method of allocating units of a resource, the method comprising the steps of:

generating a first group of information elements with each element in the first group representing one of the resource units, wherein the value of a given element in the first group indicates whether or not the corresponding resource unit is available;

generating a second group of information elements, each element in the second group of information elements corresponding to a block of information elements in the first group, each information element of the second group being indicative of whether the corresponding block of information elements of the first group includes at least one information element indicative of an available resource unit, searching the first group of information elements, in response to request, beginning at an element corresponding to a target resource unit and proceeding through the first group of elements until an element corresponding to an available resource unit is identified; and scheduling the available resource unit by altering the identified element to indicate that the available resource unit has been scheduled.

32. The method of claim 31 wherein the information elements are bits, with each bit in the first group representing one of said resource units and each bit in the second group indicating whether at least one resource unit is available in a block of bits in the first group.

33. The method of claim 32 further including the step of storing the connection identifier in a connection identifier table location corresponding to the identified bit.

34. The method of claim 33 further including the step of, if no available resource unit is located in the first block of bits in the first group of bits, using the second group of bits to identify a subsequent block of bits in the first group of bits which includes a bit indicative of an available resource unit.

35. The method of claim 34 further including the steps of:
retrieving the subsequent block of bits in the first group of bits which includes a bit indicative of an available resource unit;
searching the subsequent block of bits to locate the bit indicative of the available resource unit;
scheduling the available resource unit by altering the bit indicative of the available resource unit to indicate that the available resource unit has been scheduled;
determining if the subsequent block includes any other bits indicative of other available resource units; and
if there are no other bits in the subsequent block indicative of other available resource units, altering a bit in a second group of bits to indicate that the subsequent block of the first group includes only bits corresponding to unavailable resource units.

36. The method of claim 31, wherein said each said unit being a respective register and said resource being a memory device.

37. The method of claim 31, wherein each said unit being a respective cell time slot and said resource being a transmission link.

38. An apparatus for use in allocating units of a resource, the apparatus comprising:
a first group of memory locations for storing a first group of information elements with each element in the first group representing one of the resource units, wherein the value of a given element in the first group of bits indicates whether or not the corresponding resource unit is available;
a second group of memory locations for storing a second group of information elements, each element in the second group of information elements corresponding to a block of information elements in the first group of elements, and each information element of the second group being indicative of whether the corresponding block of elements of the first group includes at least one bit indicative of an available resource unit; and
a processor operative to search the first group of information elements, in response to a request, beginning at an element corresponding to a target resource unit and proceeding through the first group of elements until an element corresponding to an available resource unit is identified, and to schedule the available resource unit by altering the identified element to indicate that the available resource unit has been scheduled.

39. The apparatus of claim 38 wherein the first group of information elements is configured as first group of bits with each bit representing a resource unit.

40. The apparatus of claim 39 further including a memory for storing the first group of bits and a connection identifier table, wherein the connection identifier is stored in a memory location corresponding to the identified bit.

41. The apparatus of claim 40 wherein the processor is further operative, if no available resource unit is located in the first block of bits in the first group of bits, to utilize the second group of bits to identify a subsequent block of bits in the first group of bits which includes a bit indicative of an available resource unit.

42. The apparatus of claim 41 wherein the processor is further operative to retrieve the subsequent block of bits in the first group of bits which includes a bit indicative of an available resource unit, to search the subsequent block of bits to locate the bit indicative of the available resource unit, to schedule the available resource unit for use by the virtual connection by altering the bit indicative of the available resource unit to indicate that the available resource unit has been scheduled, to determine if the subsequent block includes any other bits indicative of other available resource units, and if there are no other bits in the subsequent block indicative of other available resource units, to alter a bit in a second group of bits to indicate that the subsequent block of the first group includes only bits corresponding to unavailable resource units.

43. The apparatus claim 38, wherein each said unit being a respective register and said resource being a memory device.

44. The apparatus of claim 38, wherein each said unit being a respective cell time slot and said resource being a transmission link.

* * * * *